United States Patent
Vetro et al.

(10) Patent No.: US 7,916,934 B2
(45) Date of Patent: Mar. 29, 2011

(54) METHOD AND SYSTEM FOR ACQUIRING, ENCODING, DECODING AND DISPLAYING 3D LIGHT FIELDS

(75) Inventors: Anthony Vetro, Arlington, MA (US); Sehoon Yea, Cambridge, MA (US); Wojciech Matusik, Lexington, MA (US); Hanspeter Pfister, Arlington, MA (US); Matthias Zwicker, San Diego, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1028 days.

(21) Appl. No.: 11/696,562

(22) Filed: Apr. 4, 2007

(65) Prior Publication Data

US 2008/0043095 A1 Feb. 21, 2008

Related U.S. Application Data

(63) Continuation-in-part of application No. 11/397,227, filed on Apr. 4, 2006, now Pat. No. 7,609,906.

(51) Int. Cl.
*G06K 9/00* (2006.01)
(52) U.S. Cl. .......................................... 382/154; 348/42
(58) Field of Classification Search .................. 382/154, 382/300; 348/42–60; 353/6, 7–9; D16/222; 352/57–65; 359/376–378, 458, 462–477; 356/12–14; 349/15
See application file for complete search history.

(56) References Cited

U.S. PATENT DOCUMENTS

| | | | | |
|---|---|---|---|---|
| 5,617,334 A | * | 4/1997 | Tseng et al. | 708/203 |
| 6,055,012 A | * | 4/2000 | Haskell et al. | 348/48 |
| 7,324,687 B2 | * | 1/2008 | Zitnick et al. | 382/154 |
| 7,567,648 B2 | * | 7/2009 | Tsubaki et al. | 378/41 |
| 2002/0114078 A1 | * | 8/2002 | Halle et al. | 359/619 |
| 2008/0043096 A1 | * | 2/2008 | Vetro et al. | 348/51 |

OTHER PUBLICATIONS

Duarte et al., Multiscale Recurrent Patterns Applied to Stereo Image Coding, Nov. 2005, IEEE Transactions on Circuits and Systems for Video Technology, vol. 15, No. 11, pp. 1434-1447.*
Seal et al., Depth Perception with a Single Camera, Nov. 21-23, 2005, 1st International Conference on Sensing Technology, pp. 96-101.*
Gehrig et al., Different-Distributed and Fully Flexible Image Encoders for Camera Sensor Networks, Sep. 11-14, 2005, IEEE International Conference on Image Processing, 4 pages total.*
Vetro et al., Coding Approaches for End-to End 3D TV Systems, Dec. 2004, Mitsubishi Electric Research Laboratories, 8 pages total.*

(Continued)

*Primary Examiner* — Brian P Werner
*Assistant Examiner* — Dennis Rosario
(74) *Attorney, Agent, or Firm* — Dirk Brinkman; Gene Vinokur

(57) ABSTRACT

A method and system acquire and display light fields. A continuous light field is reconstructed from input samples of an input light field of a 3D scene acquired by cameras according to an acquisition parameterization. The continuous light is reparameterized according to a display parameterization and then prefiltering and sampled to produce output samples having the display parameterization. The output samples are displayed as an output light field using a 3D display device. The reconstruction can be performed by interpolating the input samples having the different views.

24 Claims, 16 Drawing Sheets

OTHER PUBLICATIONS

Feng et al., A Scalable video codec for layered video streaming, Oct. 2004, Elsevier: Real-Time Imaging, vol. 10, pp. 297-305.*

Matusik et al., 3D TV: A Scalable system for Real-Time Acquisition, Transmission, and Autosterescopic Display of Dynamic Scenes, Aug. 2004, International Conference on Computer Graphics and Interactive Techniques: ACM SIGGRAPH 2004 Papers, pp. 814-824.*

Isaksen et al., Dynamically Reparameterized Light Fields, 2000, International Conference on Computer Graphics and Interactive Techniques: Proceddings of the 27th Annual Conference on Computer Graphics and Interactive Techniques, pp. 297-306.*

Tzovaras et al, Disparity field and depth map coding for multiview 3D image generation, 1998, Elsevier: Signal Image Communication, vol. 11, pp. 205-230.*

Heckbert, *Fundaments of Texture Mapping and Image Warping*, Ucb/csd 89/516, U.C. Berkeley, 1989.

Stewart et al., "A new reconstruction filter for undersampled light fields," *Eurographics Symposium on Rendering*, ACM International Conference Proceeding Series, pp. 150-156, 2003.

Chai et al., "Plenoptic sampling," *Computer Graphics*, SIGGRAPH 2000 Proceedings, pp. 307-318.

Buehler et al., "Unstructured Lumigraphy Rendering," Proceedings of ACM SIGGRAPH, pp. 425-432, Aug. 2001.

* cited by examiner

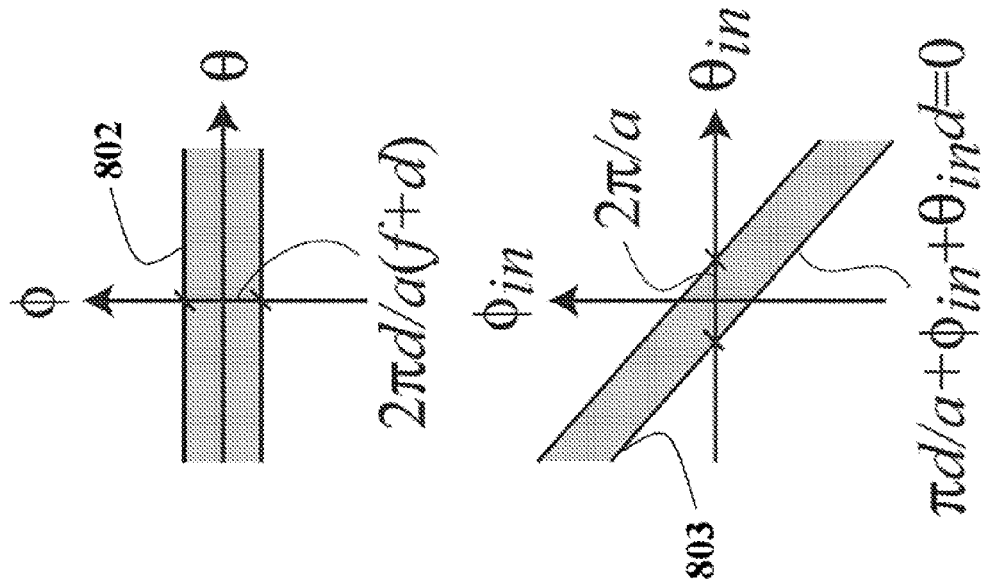
FIG. 8B
FIG. 8C
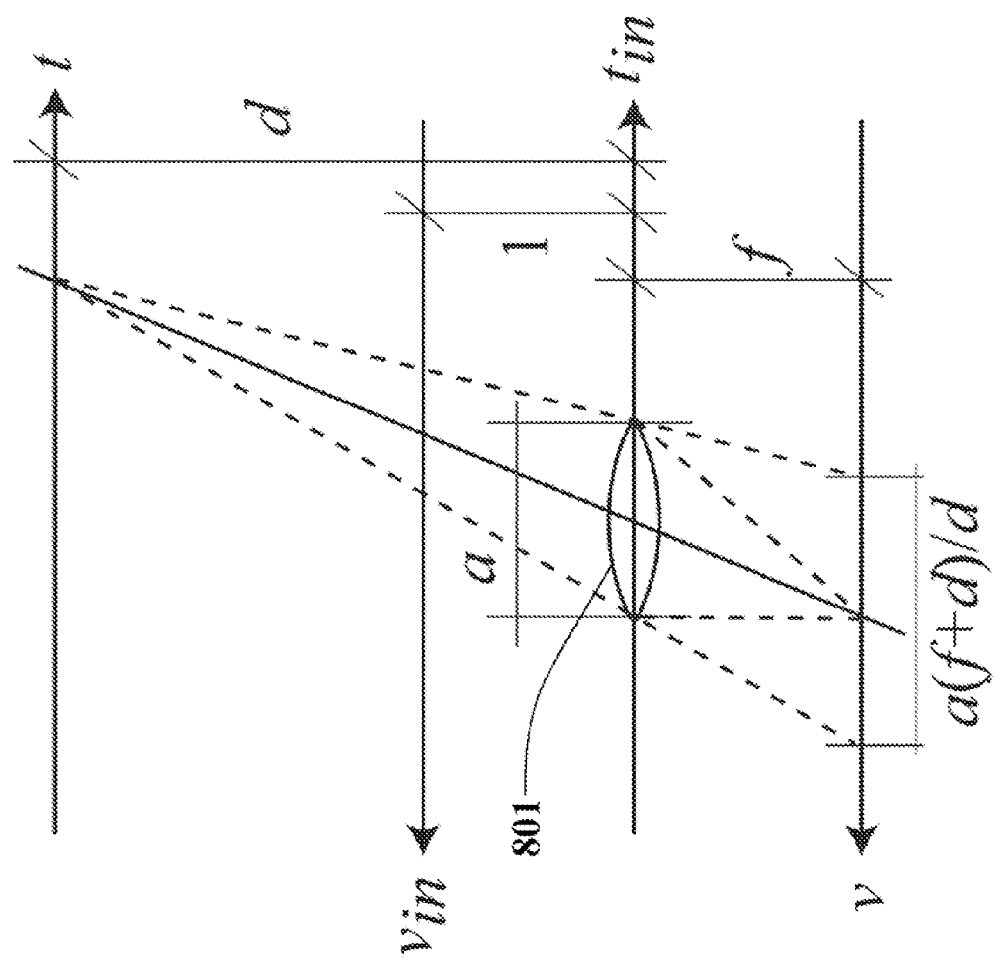
FIG. 8A

1300

METHOD AND SYSTEM FOR ACQUIRING, ENCODING, DECODING AND DISPLAYING 3D LIGHT FIELDS

RELATED APPLICATIONS

This application is a continuation-in-part of U.S. patent application Ser. No. 11/397,227 entitled "Method and System for Acquiring and Displaying 3D Light Fields" and filed by Matusik et al. on Apr. 4, 2006 now U.S. Pat. No. 7,609,906.

FIELD OF THE INVENTION

This invention relates generally to acquiring, encoding, decoding and displaying light fields, and more particularly to scalable decoding of 3D light fields, and resampling the reconstructed light fields for display onto automultiscopic display devices.

BACKGROUND OF THE INVENTION

It is desired to acquire images of real-world 3D scenes and display them as realistic 3D images. Automultiscopic displays offer uninhibited viewing, i.e., without glasses, of high-resolution stereoscopic images from arbitrary positions in a viewing zone. Automultiscopic displays include view-dependent pixels with different intensities and colors based on the viewing angle. View-dependent pixels can be implemented using conventional high-resolution displays and parallax-barriers.

In a typical automultiscopic display, images are projected through a parallax-barrier, onto a lenticular sheet, or onto an integral lens sheet. The optical principles of multiview autostereoscopy have been known for over a century, Okoshi, *Three-Dimensional Imaging Techniques*, Academic Press, 1976. Practical displays with a high resolution have recently become available. As a result, 3D television is receiving renewed attention.

However, automultiscopic displays have several problems. First, a moving viewer sees disturbing visual artifacts. Secondly, the acquisition of artifact-free 3D images is difficult. Photographers, videographers, and professionals in the broadcast and movie industry are unfamiliar with the complex setup required to record 3D images. There are currently no guidelines or standards for multi-camera parameters, placement, and post-production processing, as there are for conventional 2D television.

In particular, the pixels in the image sensor of the camera, do not map directly to pixels in the display device, in a one-to-one manner, in most practical cases. This requires resampling of the image data. The resampling needs to be done in such a way that visual artifacts are minimized. There is no prior art for effective resampling of light fields for automultiscopic displays.

Most prior art anti-aliasing for 3D displays uses wave optics. Furthermore, those methods require scene depth on a per pixel basis for appropriate filtering. In the absence of depth information, the methods resort to a conservative worst case approach and filter based on a maximum depth in the scene. In practice, this limits implementations to scenes with very shallow depths.

Generally, automultiscopic displays emit static or time-varying light fields. A light field represents radiance as a function of position and direction in regions of space free of occluders. A frequency analysis of light fields is done using a plenoptic sampling theory. There, the spectrum of a scene is analyzed as a function of object depth. This reveals that most light fields are aliased. A reconstruction filter can be applied to remove aliasing and to preserve, as much as possible, the original spectrum.

Re-parameterization can be used to display light fields on automultiscopic displays. However, reparameterization does not address display aliasing. The reconstruction filter can be enhanced with a wide aperture filter. This can produce 3D images with a larger depth of field without sacrificing the sharpness on the focal plane.

While display quality is one critical issue in a 3D rendering system, the amount of data that need to be processed, rendered, and transmitted to such displays must also be considered. Because the light field data are at least an order of magnitude larger than for systems based on stereo-image pairs, data compression processes are needed. It is particularly important that transmission bandwidth be reduced and that decoding resources in the receiver be kept to a minimum.

None of the prior art methods deal with sampling and anti-aliasing for automultiscopic displays. They do not take into account the sampling rate of the display, and only consider the problem of removing aliasing from sampled light fields during reconstruction. Furthermore, none of the prior art methods employ sampling and anti-aliasing in the context of a compression system or method.

SUMMARY OF THE INVENTION

The invention provides a three-dimensional display system and method that can be used for television and digital entertainment. Such a display system requires high quality light field data. An input light field is acquired using a camera array, and an output light field is rendered on a discrete automultiscopic display. However, most of the time, the acquisition device and the display devices have different sampling patterns.

Therefore, the invention resamples the light field data. However, resampling is prone to aliasing artifacts. The most disturbing artifacts in the display of light field data are caused by inter-perspective aliasing.

The invention provides a method for resampling light fields that minimizes such inter-perspective aliasing. The method provides a high-quality rendering of the light field onto automultiscopic display devices. The method combines a light field reconstruction filter and a display prefilter that is determined according to a sampling grid of the display device.

In contrast with prior art methods, the present resampling method does not require depth information. The method efficiently combines multiple filtering stages to produce high quality renderings. The method can be used to display light fields onto a lenticular display screen or a parallax-barrier display screen.

BRIEF DESCRIPTION OF THE DRAWINGS

FIG. 8A is a schematic of parameter planes of a camera according to an embodiment of the invention;

FIG. 8B is a schematic of an approximation of the spectrum of a camera aperture filter according to an embodiment of the invention;

FIG. 8C is a schematic of the bandwidth of the spectra shown in FIG. 8B;

DETAILED DESCRIPTION OF THE PREFERRED EMBODIMENT

System Overview

Figure 1A:
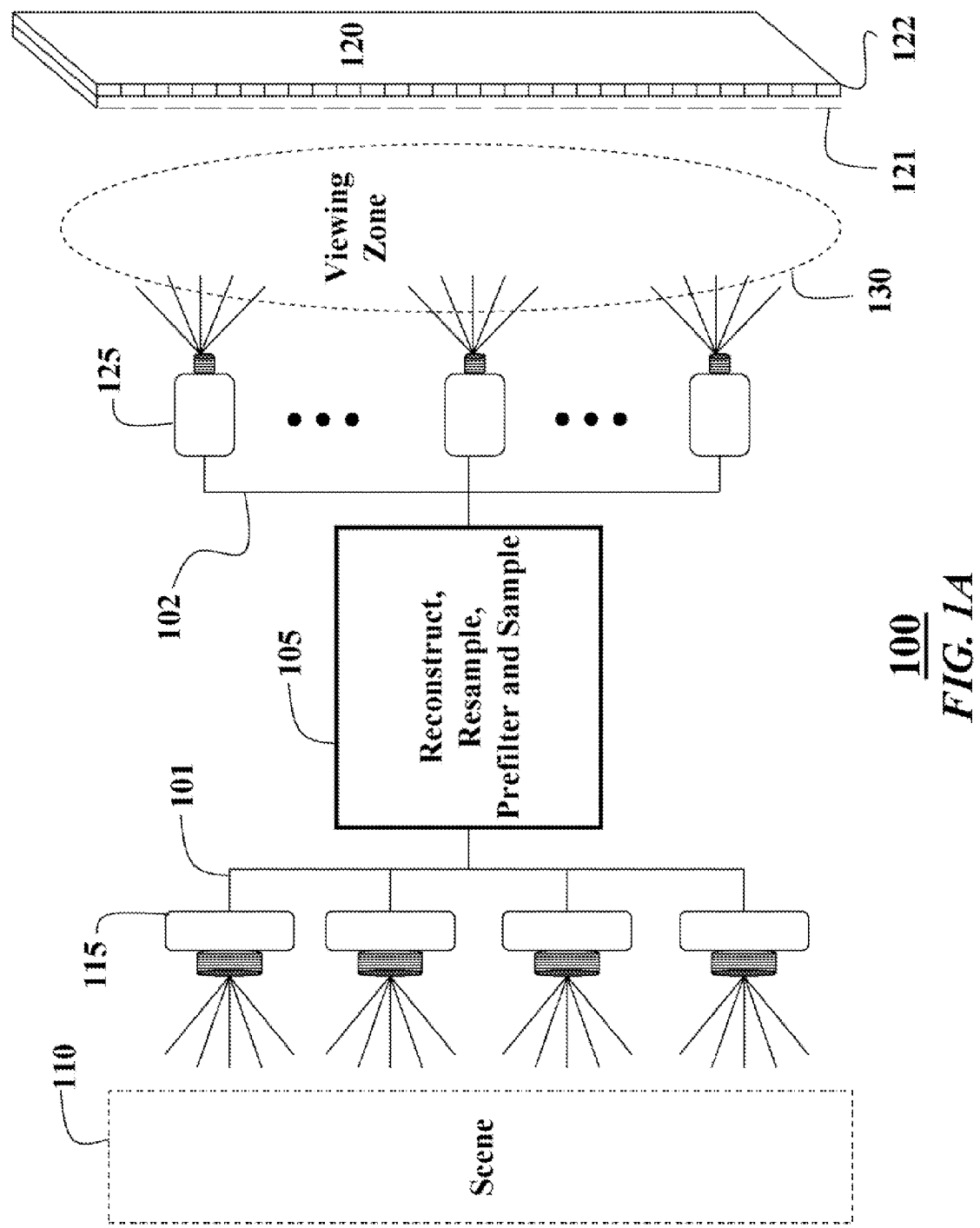
FIG. 1A is a top view schematic of a system for acquiring and displaying a 3D light field on a 3D display device according to an embodiment of the invention.

FIG. 1 shows a light field acquisition system 100 according to an embodiment of our invention. Multiple cameras 115 acquire sequences of images 101, e.g., videos, of a scene 110. The cameras can be arranged as a horizontal linear array. Preferably the cameras are synchronized with each other. The input image sequences are processed according to a method 105 of the invention. The processing includes reconstruction, resampling, prefiltering and sampling steps, to produce sequences of output images 102. The output images are then displayed onto an automultiscopic display device 120 by multiple projectors 125. The projectors can also be synchronized and arranged as a horizontal linear array. The display device 120 includes a parallax-barrier 121 mounted on a vertically oriented lenticular screen 122 on a side facing the projectors and a viewing zone 130.

Because the discrete input samples in the acquired input images 101 have a low spatial resolution and a high angular resolution while the discrete output samples in the displayed output images 102 have a high spatial resolution and a low angular resolution, the resampling is required to produce an artifact free display.

Method Overview

Figure 1B:
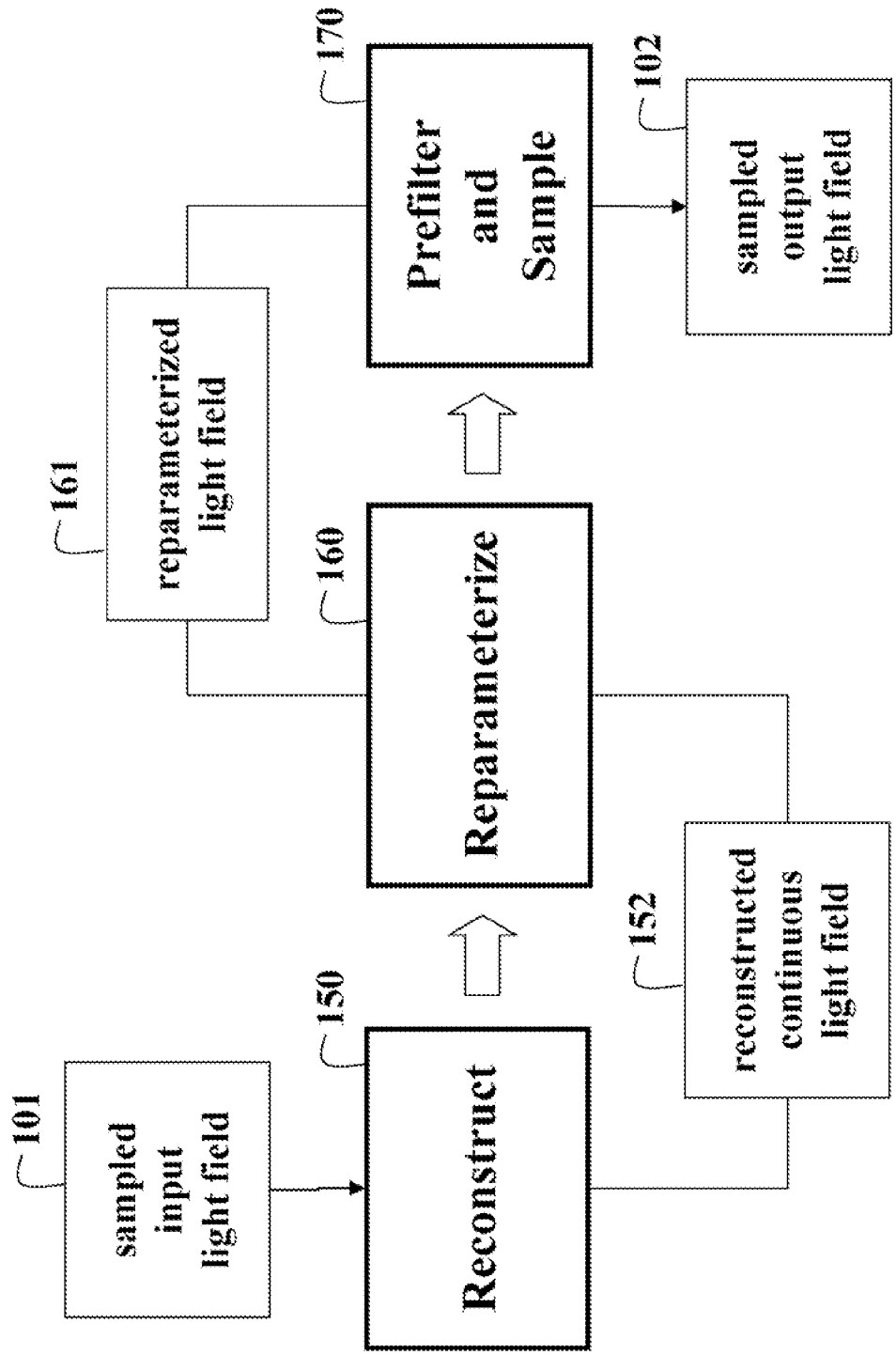
FIG. 1B is a flow diagram of a method for resampling and antialiasing a light field according to an embodiment of the invention.

As shown in FIG. 1B, the method 105 proceeds in three steps. Generally, we represent signals and filters in a frequency domain. First, a continuous signal 152 is reconstructed 150 from the input images 301. We apply known reconstruction filters. Next, we reparameterize 160 the signal to the display coordinates producing a reparameterized light field 161. In the last step 170, the signal is then prefiltered to match the Nyquist limit of the display pixel grid and sampled onto the display pixel grid as output images 102.

Display Parametrization

Figure 2:
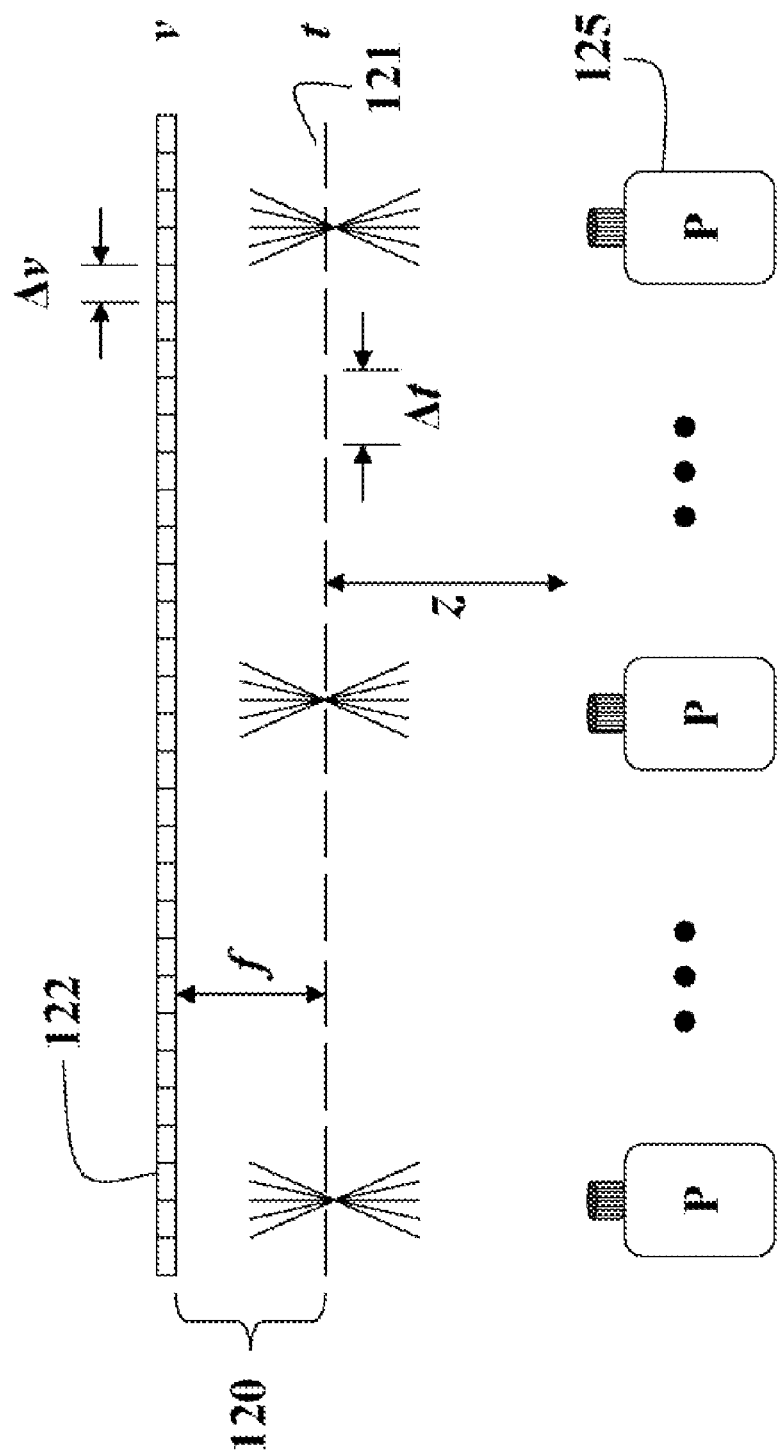
FIG. 2 is a schematic of display parameterization according to an embodiment of the invention.

FIG. 2 shows the parameterization for the multiview autostereoscopic display device 120. This parameterization attempts to reproduce a light array for every location and direction in the viewing zone 130. We parameterize light rays by their intersection with two planes. For the display device 120, we use the parallax-barrier plane 121 as t coordinates, and the high resolution screen 122 as v coordinates. Note that the v coordinates of a ray are relative to their intersection with the t plane. The pixel spacing of the screen 122 is $\Delta v$, the spacing of the gaps in the barrier 121 is $\Delta t$, the separation between the screen and barrier is f, and depth is generally indicated by z.

All rays intersecting the t-plane at one location correspond to one multi-view pixel, and each intersection with the v-plane is a view-dependent subpixel. We call the number of multi-view pixels the spatial resolution and the number of view-dependent subpixels per multi-view pixel the angular resolution.

Figure 3:
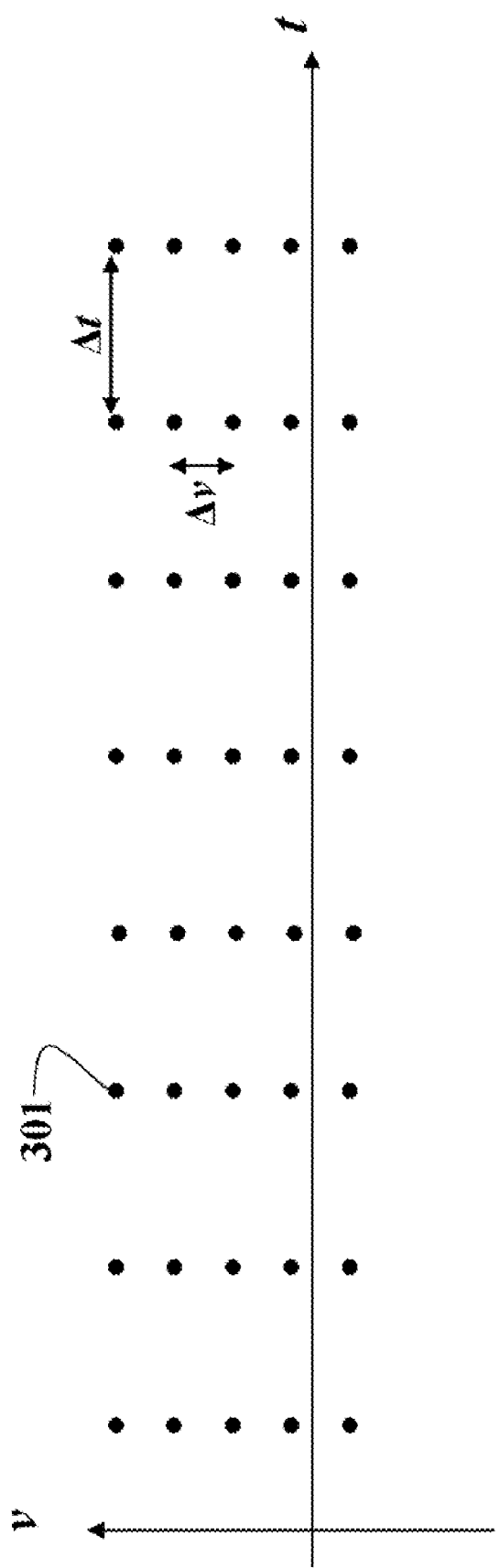
FIG. 3 is a quadrilateral sampling grid according to an embodiment of the invention.

As shown in FIG. 3, the display rays form a higher-dimensional grid in ray space. Most prior physical displays do not correspond to a quadrilateral sampling grid as shown in FIG. 3. Each ray in FIG. 2 corresponds to one sample point 301 in FIG. 3. Most automultiscopic displays only provide for horizontal parallax, i.e., the displays sample only in the horizontal direction on the v-plane. Hence, we can treat each scan line on the t-plane independently, which leads to a two-dimensional ray space.

We use the term display view to denote a slice of ray space with v=const. Note, the display views are parallel projections of the scene. Without loss of generality, we assume the distance f between the planes v and t is normalized to 1. This ray space interpretation of 3D displays enables us to understand their bandwidth, depth of field, and prefiltering.

Bandwidth

Figure 4:
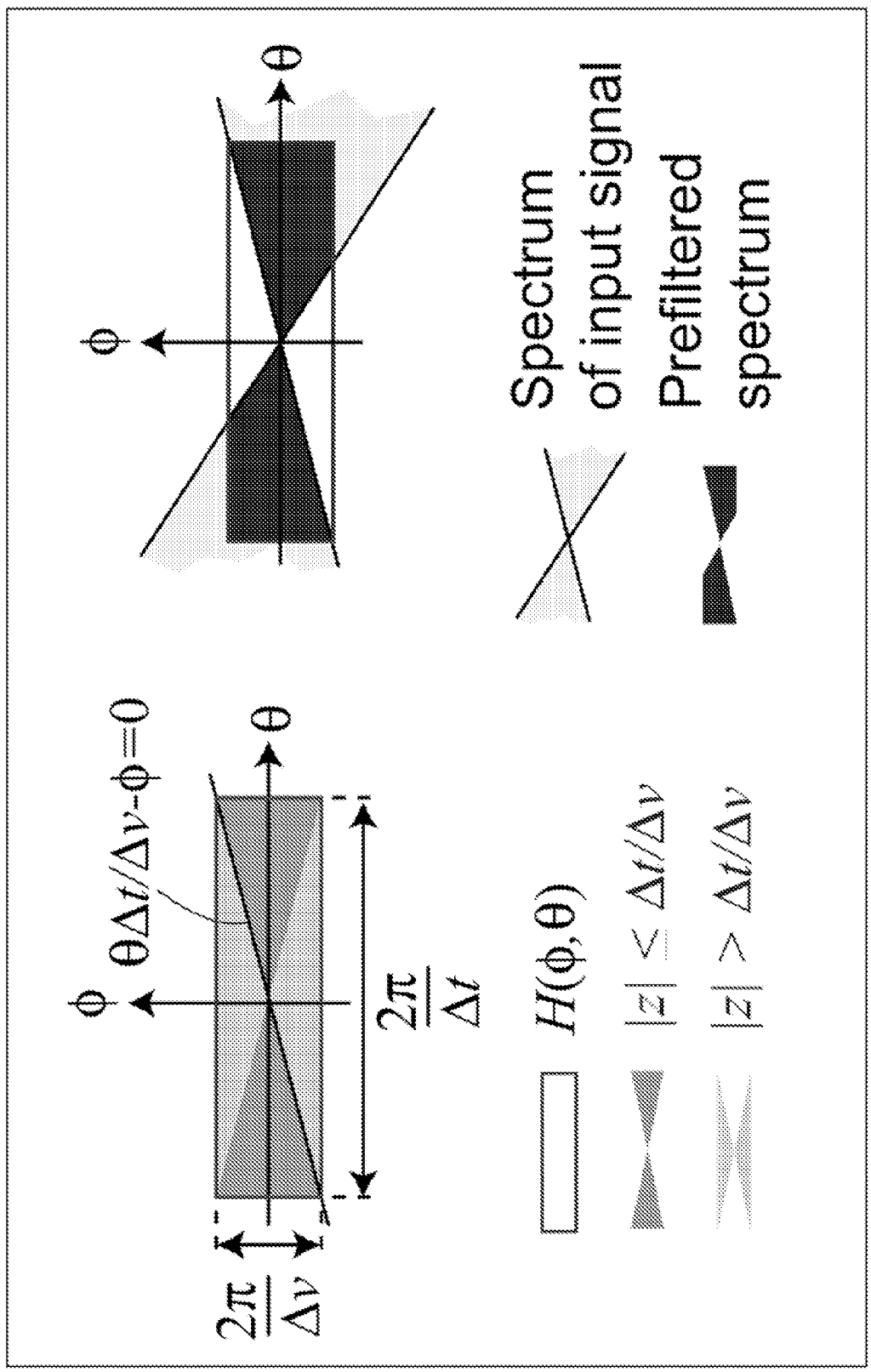
FIG. 4 is a schematic of bandwidth requirements according to an embodiment of the invention.

As shown in FIG. 4, the sampling grid in FIG. 3 imposes a strict limit on the bandwidth that can be represented by the display. This is known as the Nyquist limit. We denote angular and spatial frequencies by $\phi$ and $\theta$, and sample spacing by $\Delta v$ and $\Delta t$. Then the display bandwidth, H, is given by $$H(\phi, \theta) = \begin{cases} 1 & \text{for } |\phi| \le \pi/\Delta v \text{ and } |\theta| \le \pi/\Delta t \\ 0 & \text{otherwise} \end{cases} \quad (1)$$

Depth of Field

The depth of field of the display is given by the diagonals of its rectangular bandwidth with arbitrary relative scaling of the $\phi$ and $\theta$ axes. We selected the scaling to reflect the relative resolution of the two axes, which is usually two orders of magnitude larger in the spatial direction ($\theta$ axis), than in the angular direction ($\phi$ axis).

The spectrum of a light field, or ray space signal, of a scene with constant depth is given by a line $\phi/z+\theta=0$, where z is the distance from the t-plane, as shown in FIG. 2. For scenes at depths $|z| \le \Delta t/\Delta v$, the spectral lines intersect the rectangular display bandwidth on its left and right vertical boundary. This means these scenes can be shown at the highest spatial resolution $\theta=\pi/\Delta t$ of the display. However, for scenes with $|z|>\Delta t/\Delta v$, the spectra intersect the display bandwidth on the horizontal boundary. As a consequence, their spatial frequencies are reduced to $\theta=\pi/\Delta v$. This is below the spatial resolution of the display, and these scenes would appear blurry.

This behavior is similar to photographic depth of field effects and the range of exact refocusing in light field photography. The range $|z| \leq \Delta t/\Delta v$ is the range that can be reproduced by a 3D display at maximum spatial resolution. We call this the depth of field of the display. Similar to light field photography, the depth of field is proportional to $1/\Delta v$, or the Nyquist limit in the angular dimension.

Because available displays have a very limited angular bandwidth, the displays exhibit a shallow depth of field. For example, if $\Delta v=0.0625$ mm and $\Delta t=2$ mm, then the depth of field is only $\pm 32$ mm. This means that any scene element that appears at a distance larger than 32 mm from the display surface would be blurry. With a pitch of 0.25 mm for the view-dependent subpixels and a distance of 4 mm between the high-resolution screen and the parallax-barrier, this corresponds to eight views and a field-of-view of about 25 degrees. Although this seems like a very small range, it is sufficient to create a convincing illusion of depth perception for viewing distances up to a few meters in the viewing zone.

To characterize scenes with respect to a given display, it is useful to specify scene depth relative to the depth of field of the display. Interestingly, the ratio of scene depth over depth of field, $d(z)=z\Delta v/\Delta t$, corresponds to the disparity between views on the display. In other words, scene depth and view disparity are interchangeable. By this definition, scenes with maximum disparity $d<1$ lie within the depth of field of the display. A given disparity $d>1$ means that the spatial bandwidth is reduced by a factor of $1/d$.

Prefiltering

When sampling a continuous signal we need to band-limit the signal to avoid aliasing. From Equation 1, we see that for 3D displays this is a simple matter of multiplying the input spectrum by the spectrum of the display prefilter H that discards all portions of the input outside the rectangular display bandwidth, see FIG. 4, right. Note that this prefilter only deals with aliasing due to the display grid and does not take into account aliasing that can occur during light field acquisition.

Prior art bandwidth analysis of 3D displays is mostly based on wave optics or geometric criteria, as opposed to signal processing according to the embodiments of the invention. While wave optics is useful to study diffraction effects, they are not effective for analyzing discrete 3D displays, which operate far from the diffraction limit.

In contrast to our approach, prior art techniques derive a model of display bandwidth that requires an explicit knowledge of scene depth. Those techniques advocate depth-dependent filtering of 2D input images. Band-limiting each 2D view separately is challenging, because filtering needs to be spatially varying. One solution applies a linear filter corresponding to the maximum depth in the scene to each view. However, that wastes a large part of the available display bandwidth and leads to overly blurry results. In contrast, with our method, pre-filtering is a linear operation in ray space.

Without our prefiltering, aliasing appears as ghosting artifacts. Our resampling preserves spatial frequencies around the zero-disparity plane, i.e., around the t-plane in the ray space parameterization of the display.

Resampling for 3D Displays

Above, we analyze the bandwidth of automultiscopic displays and how continuous input signals need to be pre-filtered to avoid aliasing. However, in practice, light fields are represented as sampled signals, which are usually acquired using camera arrays. To show a sampled light field on an automultiscopic display, the samples 101 of the input light field need to be mapped to the samples 102, i.e., pixels, of the display.

Unfortunately, the sampling patterns of typical light field acquisition devices, such as a camera array, and automultiscopic displays do not lead to a one-to-one correspondence of rays. Hence, showing a light field on an automultiscopic display involves a resampling operation.

We now describe a resampling framework that avoids aliasing artifacts due to both sampling steps involved during light field acquisition and light field displaying, i.e., the sampling that occurs during scene acquisition, and the sampling that is performed when mapping camera samples to display pixels.

Our technique is based on a resampling methodology described by Heckbert, *Fundamentals of Texture Mapping and Image Warping*, Ucb/csd 89/516, U.C. Berkeley, 1989, incorporated herein by reference. However, that resampling is for texture mapping in computer graphics. In contrast, we resample a real-world light field.

We describe how to reparameterize the input light field and represent it in the same coordinate system as the display. This enables us to derive a resampling filter that combines reconstruction and prefiltering, as described below.

Reparameterization

Before deriving our combined resampling filter, we need to establish a common parameterization for the input light field and the 3D display. We restrict the description to the most common case where the light field parameterizations are parallel to the display.

The input coordinates of the camera and the focal plane are designated by $t_{in}$ and $v_{in}$, respectively, the distance or depth from the $t_{in}$ axis by $z_{in}$, and the inter-sampling distances by $\Delta t_{in}$ and $\Delta v_{in}$. The $t_{in}$ axis is also called the camera baseline. Similarly, we use display coordinates $t_d$, $v_d$, $z_d$, $\Delta t_d$, and $\Delta v_d$. Without loss of generality, we assume that the distance between the t- and v-planes for both the display and the input light field is normalized to 1.

The relation between input and display coordinates is given by a single parameter $f_{in}$, which is the distance between the camera plane $t_{in}$ and the zero-disparity plane $t_d$ of the display. This translation corresponds to a shear in ray space $$\begin{bmatrix} v_{in} \\ t_{in} \end{bmatrix} = \begin{bmatrix} 1 & 0 \\ f_{in} & 1 \end{bmatrix} \begin{bmatrix} v_d \\ t_d \end{bmatrix} = M \begin{bmatrix} v_d \\ t_d \end{bmatrix}. \qquad (2)$$

M is the 2×2 matrix in the middle part of this equation.

Automultiscopic displays usually have a high spatial resolution, e.g., several hundred multiview-pixels per scan line, and tow angular resolution, e.g., about ten view-dependent sub-pixels. In contrast, the acquired light fields have a low spatial resolution, e.g., a few dozen cameras, and high angular resolution, e.g., several hundred pixels per scan line.

Figure 5:
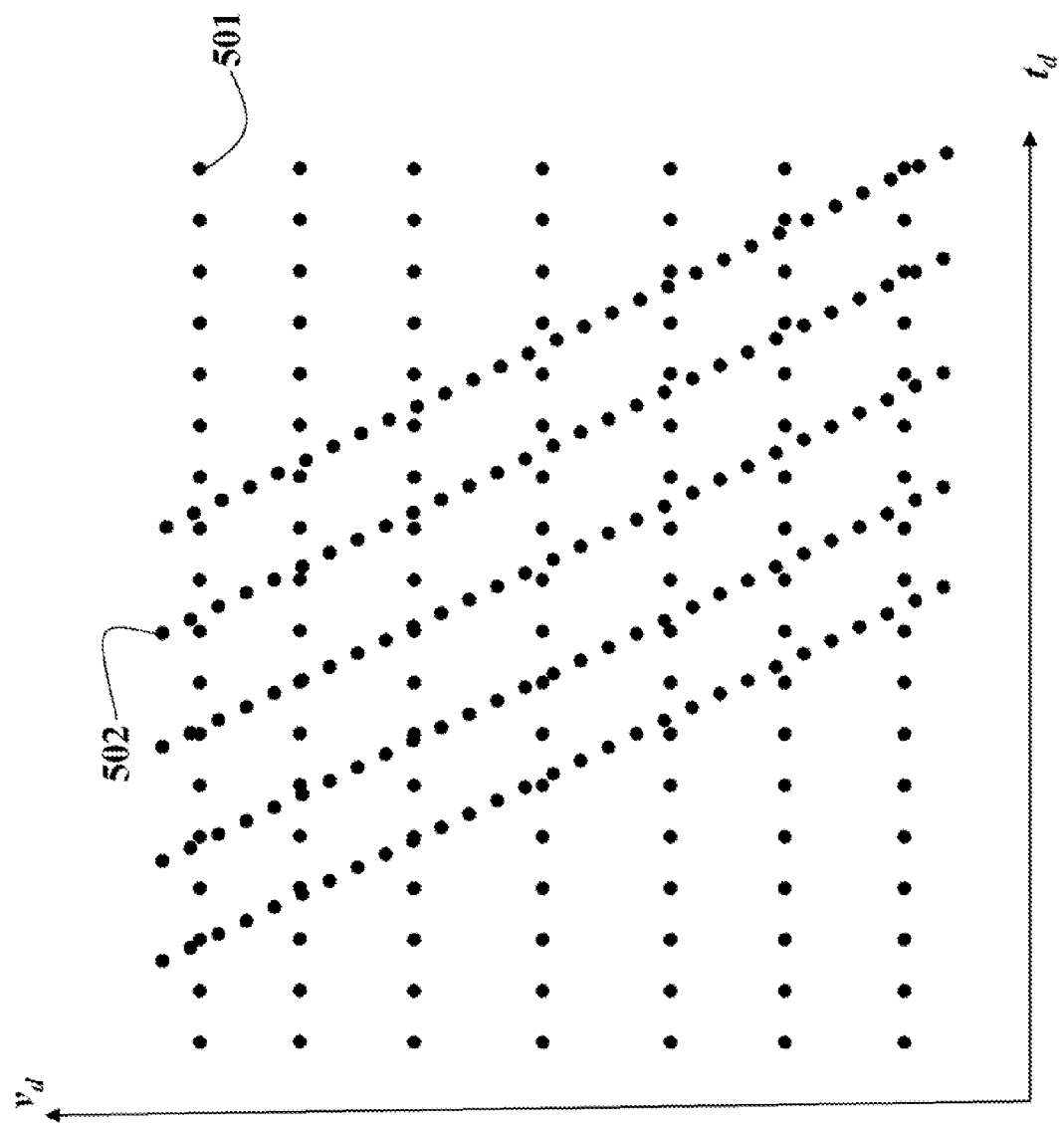
FIG. 5 is a schematic superimposing scan line samples of a camera and a display device according to an embodiment of the invention.

As shown in FIG. 5, this leads to two sampling grids that are highly anisotropic and that are skewed with respect to each other. In FIG. 5, samples 501 represent display scan line samples, and samples 502 represent camera scan line samples.

Combined Resampling Filter

Figure 6:
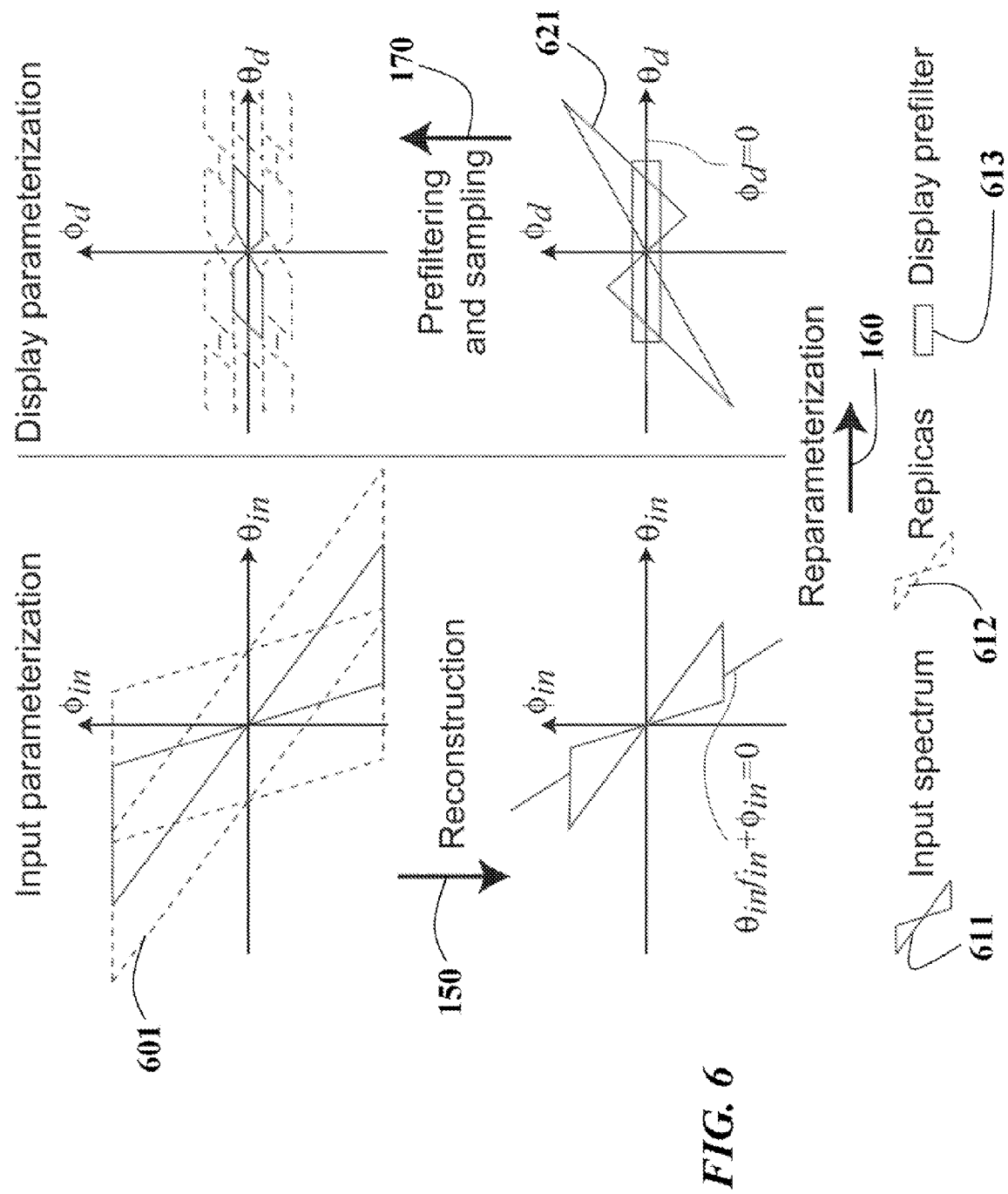
FIG. 6 is a schematic of a method for sampling and filtering according to an embodiment of the invention.

FIG. 6 shows the resampling method in greater detail. The left side is the input parameterization, the right side the output parameterization, and the bottom the reparameterization from the acquisition space to the display space. FIG. 6 symbolically shows the input spectrum 611, replicas 612, and filters 613.

As shown in FIG. 6, the resampling method for 3D display antialiasing proceeds in three steps where we represent signals and filters in the frequency domain. First, a continuous signal is reconstructed 150 from the input data 101 given in its original input parameterization 601, which we denote by angular and spatial frequencies $\phi_{in}$ and $\theta_{in}$.

Care has to be taken to avoid aliasing problems in this step and to make optimal use of the input signal. We apply known reconstruction filters for light field rendering, see Stewart et al., "A new reconstruction filter for undersampled light fields," *Eurographics Symposium on Rendering*, ACM International Conference Proceeding Series, pp. 150-156, 2003, and Chai et al., "Plenoptic sampling," *Computer Graphics*, SIGGRAPH 2000 Proceedings, pp. 307-318, both incorporated herein by reference.

These techniques extract a maximum area of the central replica from the sampled spectrum, while discarding portions that overlap with neighboring replicas.

Next, we reparameterize 160 the reconstructed signal to display coordinates 621, denoted by $\phi_d$ and $\theta_d$, using the mapping described above.

Then, in the last step 170, the signal is prefiltered to match the Nyquist limit of the display pixel grid as described above, and sampled onto the display pixel grid. The prefiltering guarantees that replicas of the sampled signal in display coordinates do not overlap. This avoids blurring effects.

We now derive a unified resampling filter by combining the three steps described above. We operate in the spatial domain, which is more useful for practical implementation. We proceed as follows:

Given samples $\xi_{i,j}$ of an input light field 101, we reconstruct 150 a continuous light field $l_{in}$ 152:

$$l_{in}(v_{in}, t_{in}) = \sum_{i,j} \xi_{i,j} r\left(\begin{bmatrix} v_{in} - i\Delta v_{in} \\ t_{in} - j\Delta t_{in} \end{bmatrix}\right), \quad (3)$$

where r denotes the light field reconstruction kernel.

Using Equation (2), we reparameterize 160 the reconstructed light field 152 to display coordinates 161 according to:

$$l_d(v_d, t_d) = l_{in}\left(M \begin{bmatrix} v_d \\ t_d \end{bmatrix}\right). \quad (4)$$

We convolve the reconstructed light field, represented in display coordinates, with the display prefilter h, which yields a band-limited signal $$\bar{l}_d(v_d, t_d) = (l_d \otimes h)(v_d, t_d). \quad (5)$$

Sampling this signal on the display grid does not produce any aliasing artifacts.

By combining the above three steps, we express the band-limited signal as a weighted sum of input samples $$\bar{l}_d(v_d, t_d) = \sum_{i,j} \xi_{i,j} \rho\left(\begin{bmatrix} v_d \\ t_d \end{bmatrix} - M^{-1}\begin{bmatrix} i\Delta v_{in} \\ j\Delta t_{in} \end{bmatrix}\right). \quad (6)$$

The weighting kernel $\rho$ is the so-called resampling filter. It is defined as the convolution of the reconstruction kernel, expressed in display coordinates, and the prefilter $$\rho(v_d, t_d) = (r(M[\cdot]) \otimes h)(v_d, t_d). \quad (7)$$

We implemented all light field resampling filters using conventional Gaussians functions.

Because both the reconstruction filter and the prefilter are highly anisotropic, we carefully align the filters to preserve as much signal bandwidth as possible. Note that Equation (2) implies $[\phi_{in}, \theta_{in}] = [\phi s, \theta_d] M^{-1}$. Therefore, the input spectrum is sheared along the vertical axis.

We also note that the line $\theta_{in} f_{in} + \phi_{in} = 0$, corresponding to depth $z_{in} = f_{in}$, is mapped to the zero-disparity plane of the display. Hence, the depth of field of the display, expressed in input coordinates, lies at distances $f_{in} = \Delta t/\Delta v$ from the cameras. This means that the distance $f_{in}$ between the camera plane and the display plane is selected such that, for objects of interest, $z_{in} - f_{in} = zd < \Delta t/\Delta v$.

Camera Baseline and Depth of Field

The relation between the input light field and the output light field as described above implies that the display acts as a virtual window to a uniformly scaled scene. The display reproduces the light field of the scene at a different, usually smaller, scale. However, often it is neither desirable nor practically possible to achieve this.

It is not unusual that the depth range of the scene by far exceeds the depth of field of the display, which is relatively shallow. This means that large parts of the scene are outside the display bandwidth, which may lead to overly blurred views. In addition, for scenes where the objects of interest are far from the cameras, like in outdoor settings, the above assumption means that a very large camera baseline is required. It would also mean that the pair of stereoscopic views seen by an observer of the display would correspond to cameras that are physically far apart, much further than the two eyes of an observer in the real scene.

The problems can be solved by changing the size of the camera baseline. This can be expressed as an additional linear transformation of the input light field that reduces the displayed depth of the scene. This additional degree of freedom enables us to specify a desired depth range in the input scene that needs to be in focus. We deduce the required camera baseline scaling that maps this depth range to the display depth of field.

Camera Baseline Scaling

Figure 7:
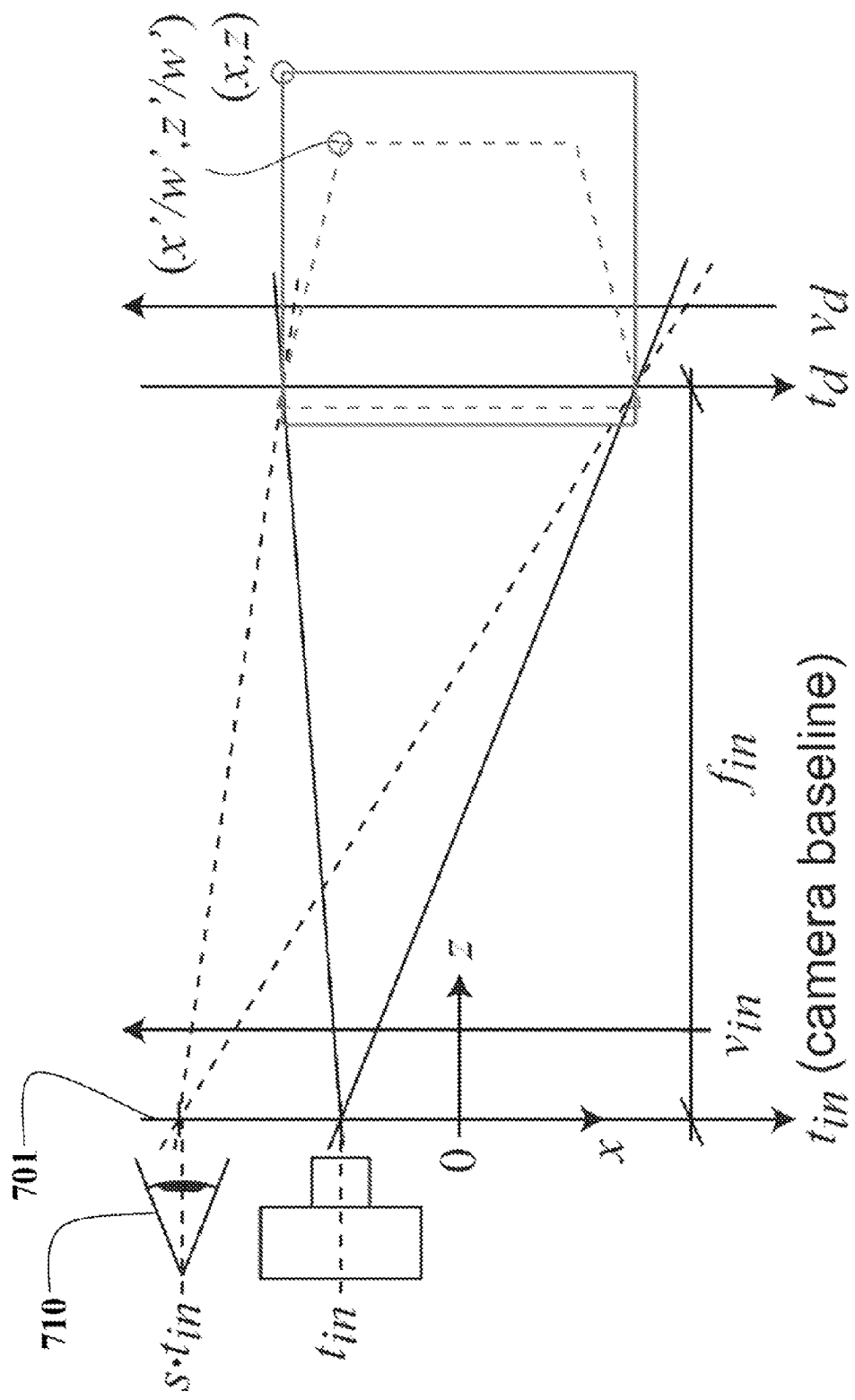
FIG. 7 is a schematic of a transformation from a light field acquisition geometry to a light field display geometry according to an embodiment of the invention.

As shown in FIG. 7, modifying the camera baseline $t_{in}$ 701 during acquisition corresponds to the transformation of the displayed configuration. In FIG. 7, the solid lines indicates the acquisition geometry, and the dashed lines the display geometry.

An observer 710 at a given position sees the perspective view that is acquired by a camera closer to the center of the camera baseline. That is, we remap each acquired camera ray such that its intersection with the baseline plane $t_{in}$ is scaled by a factor s>1, while its intersection with the zero-disparity plane of the display, i.e., the $t_d$-plane, is preserved.

This mapping corresponds to a linear transformation of input ray space, and any linear transformation of ray space corresponds to a projective transformation of the scene geometry. For the transformation shown in FIG. 7, the projective transformation is $$\begin{bmatrix} x' \\ z' \\ w' \end{bmatrix} = \begin{bmatrix} sf_{in} & 0 & 0 \\ 0 & sf_{in} & 0 \\ 0 & s-1 & f_{in} \end{bmatrix} \begin{bmatrix} x \\ z \\ 1 \end{bmatrix}, \quad (8)$$

i.e., a point (x, z) in the scene is mapped to (x'/w', z'/w'). The projective transformation of scene geometry is also illustrated in FIG. 7. This scene transformation is closely related to depth reduction techniques used with stereoscopic displays, which are used to aid stereo-view fusion. This transformation moves points at infinity, i.e., z=∞, to a finite depth $$z'/w'=(f_{in}s/(s-1+f_{in}).$$

In addition, as s approaches infinity, z'/w' approaches $f_{in}$. This means that scene depth is compressed towards the zero-disparity plane of the display. We generalize the transformation from display to input coordinates by including the mapping shown in FIG. 7, which leads to $$\begin{bmatrix} v_{in} \\ t_{in} \end{bmatrix} = \begin{bmatrix} \frac{1}{f_{in}} & 0 \\ 0 & 1 \end{bmatrix} \begin{bmatrix} 1 & s-1 \\ 0 & s \end{bmatrix}^{-1} \begin{bmatrix} \frac{f_{in}}{f_d} & 0 \\ \frac{f_{in}}{f_d} & 1 \end{bmatrix} \begin{bmatrix} v_d \\ t_d \end{bmatrix} \quad (9)$$

$$= M(f_{in}, s) \begin{bmatrix} v_d \\ t_d \end{bmatrix}.$$

We call this mapping $M(f_{in}, s)$ to emphasize that it is determined by the free parameters $f_{in}$ and s.

Controlling Scene Depth of Field

In a practical application, a user wants to ensure that a given depth range in the scene is mapped into the depth of field of the display and appears sharp. Recall that the bandwidth of scene elements within a limited depth range is bounded by two spectral lines. In addition, the depth of field of the display is given by the diagonals of its rectangular bandwidth. Using the two free parameters in Equation (9), s for scaling the camera baseline and $f_{in}$ for positioning the zero-disparity plane of the display with respect to the scene, we determine a mapping that aligns these two pairs of lines, which achieves the desired effect.

We determine the mapping by equating the two corresponding pairs of spectral lines, i.e., the first pair bounds the user specified depth range mapped to display coordinates, and the second pair defines the depth of field of the display. Let us denote the minimum and maximum scene depth, $z_{min}$ and $z_{max}$, which the user desires to be in focus on the display by $z_{front}$ and $z_{back}$. The solution for the parameters s and $f_{in}$ is $$f_{in} = \frac{2z_{max}z_{min} + \frac{\Delta t}{\Delta v}(z_{max} - z_{min})}{(z_{min} + z_{max})}, \quad (10)$$

$$s = \frac{\frac{\Delta v}{\Delta t}(z_{min} + z_{max})^2 / \left(1 - \frac{\Delta v}{\Delta t}z_{max}\right)}{2\left(z_{min} - \frac{\Delta v}{\Delta t}z_{max}z_{min} - z_{max} + \frac{\Delta v}{\Delta t}z_{min}^2\right)}. \quad (11)$$

Optimizing Acquisition

The spectrum and aliasing of a light field shown on a 3D display depends on a number of acquisition parameters (acquisition parameterization) and display parameters (display parameterization), such as the number of cameras, their spacing, their aperture, the scene depth range, and display resolution. The decisions of a 3D cinematographer are dictated by a combination of artistic choices, physical constraints and the desire to make optimal use of acquisition and display bandwidths. Therefore, we analyze how these factors interact and influence the final spectrum and aliasing for 3D display.

First, we described the effect of camera aperture on the acquired bandwidth. Then, we describe the consequences of all the acquisition parameters and the display parameters, and show how this analysis can be used to optimize the choice of parameters during acquisition.

Finite Aperture Cameras

Chat et al., above, described the spectrum of light fields acquired with idealized pin-hole cameras. Here, we show that the finite aperture of real cameras has a band-limiting effect on the spectrum of pinhole light fields. Out derivation is based on a slightly different parameterization than shown in FIGS. 2, 3, 5 and 7.

As shown in FIG. 8A, we select the t-plane as the common focal plane of the cameras and $t_{in}$ is the plane of the lens 801 separated by a distance d, and the v-plane as the plane that contains the camera sensors. The planes $v_{in}$ and $t_{in}$ are separate by a distance 1, as before.

We assume that an aperture of size a lies on the lens at a distance f from the camera sensor. This is not exactly the case for real lenses, but the error is negligible for our purpose. According to a thin lens model, any ray l(v, t) acquired at the sensor plane corresponds to a weighted integral of all rays Ī(v, t) that pass through the lens:

$$l(v, t) = \frac{1}{f^2} \int_{v-\frac{a(f+d)}{2d}}^{v+\frac{a(f+d)}{2d}} \bar{l}(v, t) \cos^4 \alpha \, dv, \quad (12)$$

where the range of integration corresponds to the aperture as shown in FIG. 8A, and α is the angle between the sensor plane normal and the ray. Although we are working with 2D instead of 4D light fields and 1D instead of 2D lenses and sensors, our derivations equally apply to the higher dimensional case.

Then, imagine that we 'slide' the lens on a plane parallel to the v-plane. This can be expressed as the convolution $$l(v, t) = \frac{1}{f^2} \int_{-\infty}^{\infty} \bar{l}(x, y) b(v - x, y) dx dy, \quad (13)$$

where b(v, t) is the aperture filter. We ignore the $\cos^4$ term and define b as $$b(v, t) = \begin{cases} 1 & |v| < (v - a(f + d))/(2d), t = 0 \\ 0 & \text{otherwise} \end{cases} \quad (14)$$

$$\int \int b(v, t) = 1.$$

In the Fourier domain, the convolution in Equation (13) is a multiplication of the spectra of the scene light field and the camera aperture filter. We approximate the spectrum of the camera aperture filter, which is a sine cardinal function (sin c) in φ translated along θ, by a box 802 of width 2πd/(a(f+d)) in φ translated along θ, as shown in FIG. 8B.

We now change coordinates back to the parameterization of the input light field, using a similar transformation as used for the resampling above, which results in the bandwidth 803 shown in FIG. 8C. A continuous light field observed through a lens with finite aperture a focused at the distance d is band limited to a sheared slab of width 2π/a and slope -d.

Bandwidth Utilization and Minimum Sampling

In a practical application, the number of available cameras is limited. The placement of the cameras can also be constrained. Therefore, it is desired to determine an optimal arrangement for the limited and constrained resources. With our resampling technique the setup can be estimated. Given the acquisition parameters, we can determine the optimal 'shape' of the resampling filter and analyze its bandwidth relative to the display bandwidth.

We realize that aliasing in the sampled input signal 101 is the main factor that reduces available bandwidth. There are two main options to increase this bandwidth, given a fixed number of cameras. First, we can decrease the camera baseline, which decreases the depth of the scene as it is mapped to the display. In this case, the input spectrum becomes narrower in the angular direction $\phi_d$ because of depth reduction. Obviously, decreasing the camera baseline too much may render scene depth imperceptible. Second, we can increase the camera aperture. However, if the camera aperture is too big, the acquired depth of field may become shallower than the display depth of field. We select the focal depth of the cameras to be equal $f_{in}$, which means that the slab of the acquired input spectrum is parallel, to the rectangular display bandwidth.

In an alternative setup, it is desired to acquire a given scene and keep objects at a certain depth in focus. Therefore, the minimum sampling rate required to achieve high quality results on the display is determined. Intuitively, the sampling rate is sufficient for a given display when no reconstruction aliasing appears within the bandwidth of the display. Increasing the acquisition sampling rate beyond this criterion does not increase output quality.

We use Equation (11) to determine the focal distance $f_{in}$ and the baseline scaling s, which determine the mapping from input to display coordinates. Then, we derive the minimum sampling rate, i.e., the minimum number and resolution of cameras, by finding the tightest packing of replicas of the input spectrum such that none of the non-central replicas overlap with the display prefilter. It is now possible to reduce the number of required cameras to the angular resolution of the display. However, achieving this is often impractical because larger camera apertures are required.

View Interpolation

As an alternative to the reconstruct step 150 and reparameterize step 160, view interpolation can be used to determine the reparameterized light field 161 from the sampled input light field 101. If depth maps are available, view interpolation can be achieved using reprojection, e.g., using the unstructured lumigraph rendering process of Buehler et al., "Unstructured Lumigraph Rendering," Proceedings of ACM SIGGRAPH, pp. 425-432, August 2001, incorporated herein by reference.

To avoid aliasing artifacts, the signal is oversampled along the v-plane. The oversampled signal has reduced aliasing artifacts within the display bandwidth. View interpolation techniques are used to generate more views than the display actually provides, i.e., at a smaller spacing in the v-plane. After filtering, the signal is subsampled to the original resolution of the display, i.e., the display parameterization.

Aliasing is prevented if none of the non-central replicas of the input spectrum, overlap with the display prefilter. We assume that the multi-view signal, sampled at the display resolution, has a maximum disparity of d pixels. The slopes of the spectrum correspond to the maximum disparity d. Therefore, the horizontal spacing of the slopes of the spectrum need to be at least (d+1)/2 pixels to remove overlap with the filter. This implies an oversampling factor of (d+1)/2. Therefore, for a display with k views, the total number of views to interpolate is at least k*((d+1)/2) views.

Display Pre-Filtering

Pre-filtering of the multiview video is applicable for systems in which the parameters of the 3D display is known, and the signal bandwidth can be matched to the capabilities of the display prior to compression. This type of processing is applicable for video game systems, or digital cinema applications, and it is useful to minimize the required bandwidth of the signal to be transmitted.

Figure 9:
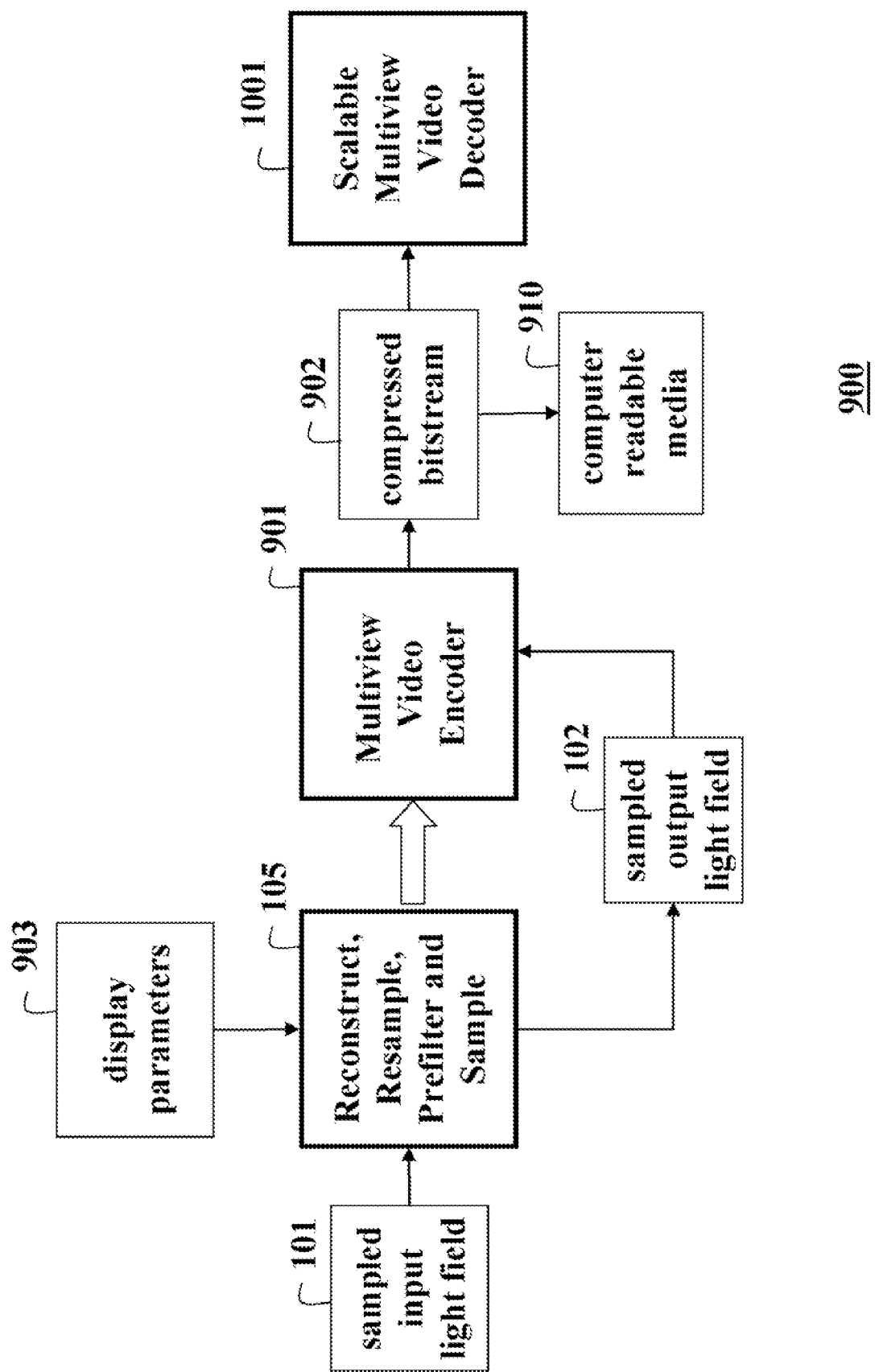
FIG. 9 is a flow diagram of a method for antialiasing and compression according to an embodiment of the invention.

FIG. 9 shows a display pre-filtering method 900. The sampled input light field 101 is subject to the method 105 to yield the sampled output light field 102. The sampled output light field is input to a multiview video encoder 901. The output of the encoder 901 is a compressed bitstream 902. The compressed bitstream can be stored on computer readable media 910, for later playback, or transmitted to a scalable multi-view video decoder 1001, described in greater detail below.

A key objective of the method 105 is to ensure that the data are sampled at the resolution of the display grid. It is also important that high frequency content that is beyond the Nyquist limit of the display is removed from the input light field 101. Because these frequencies appear as aliasing on a multi-view display, the filtering step in method 105 does not reduce image quality. However, the method 105 does have a positive effect on the compression efficiency by suppressing the energy in select parts of the input spectrum. Experimental results show that the bandwidth to compress the sampled output light field 102 is reduced by a factor of 2 compared to the case in which the method 105 is not applied and the input light field 101 is directly compressed.

Scalable Decoding

For applications that do not have access to the parameters of the display device prior to compression, such as consumer broadcast and video conferencing applications, the compression format is designed to accommodate various decoding and display capabilities. In such systems, it is important that the compression format minimizes enable decoding resources.

Figure 10:
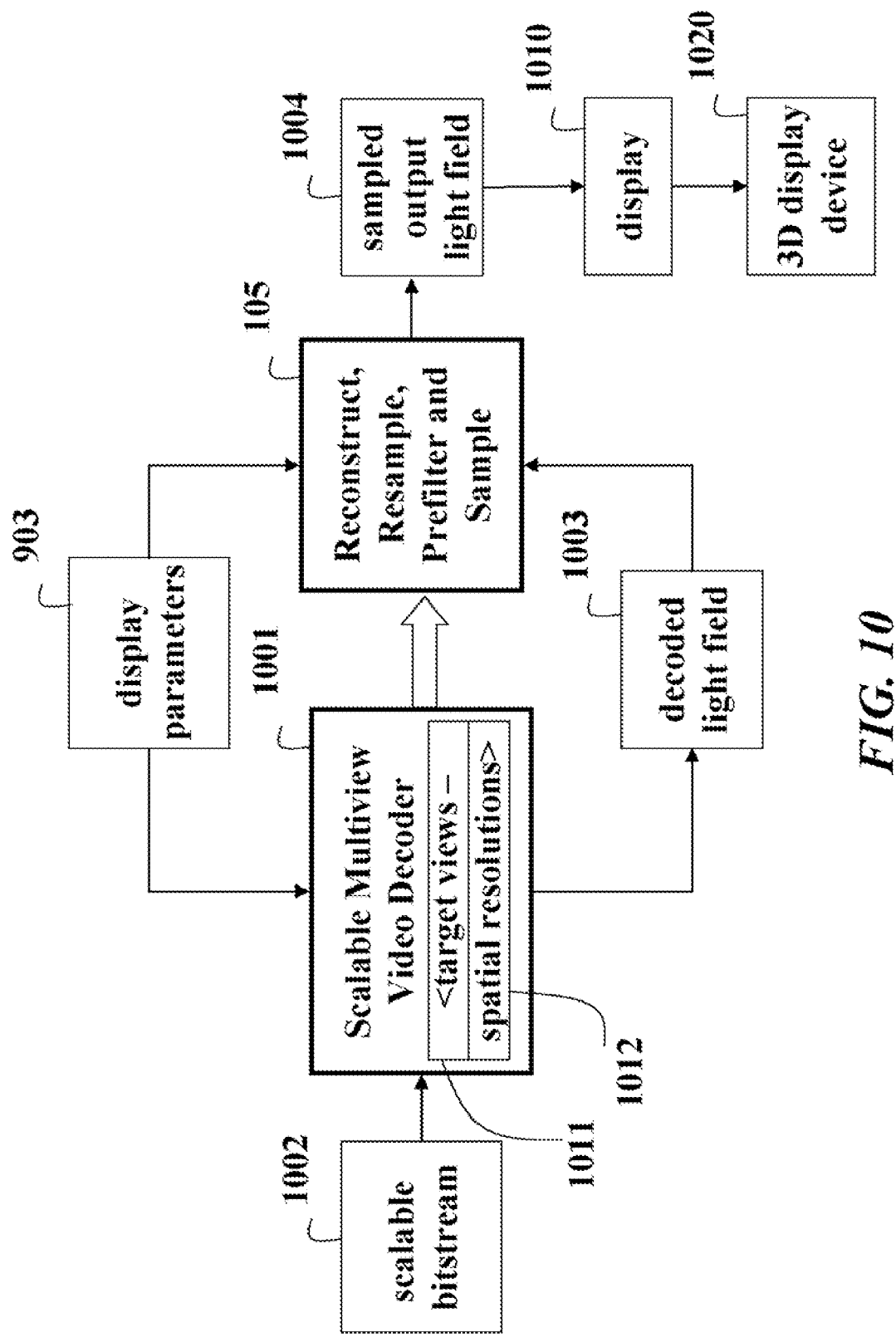
FIG. 10 is a block diagram of a receiver system for scalable decoding and antialiasing according to an embodiment of the invention.

FIG. 10 shows a receiver system 1000 that includes a scalable multi-view video decoder 1001 followed means that implement the method 105. A scalable bitstream 1002 and display parameters (display parameterization) 903 are provided as input to the scalable multi-view video decoder 1001 to yield a decoded light field 1003. The decoded light field 1003 is then provided to means that implement the method 105 to produce a sampled output light field 1004, which can be displayed 1110 on a 3D display device 1120.

The scalable decoder 1001 supports both view scalability and spatial scalability. The main benefit of the scalable decoder in the receiver system 1000 is to facilitate efficient decoding with the method 105 applied prior to rendering the light field onto the display device. The display parameters (display parameterization) 903 are provided to the scalable multi-view video decoder 1001, which determines a set of target views 1011, and an associated spatial resolution 1012 for each target view of the decoded light field 1003.

View Scalability

Figure 11:
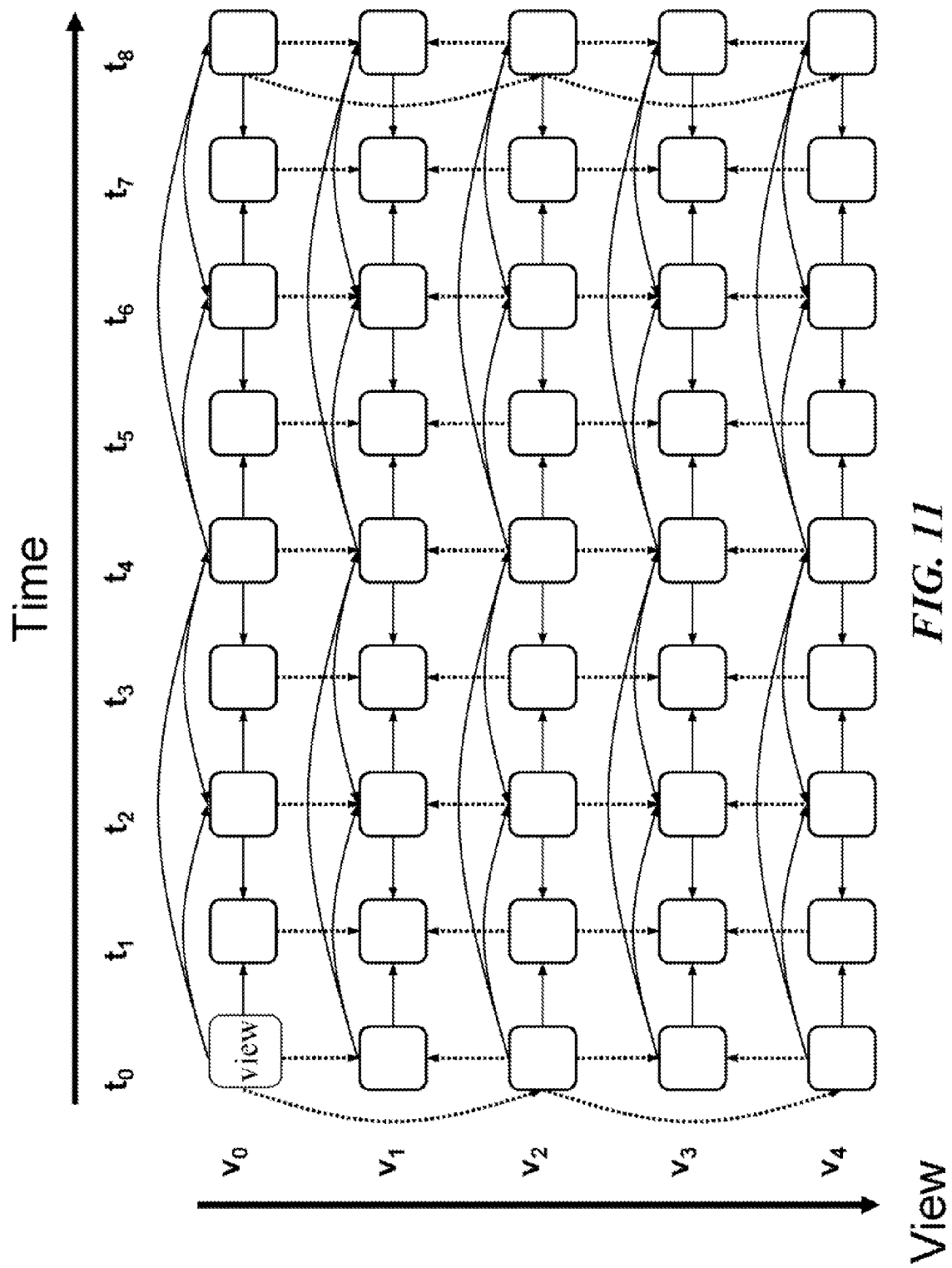
FIG. 11 is a schematic of a multiview video prediction structure according to an embodiment of the invention.

Performing efficient compression relies on having good predictors. While the correlation between temporally adjacent pictures is often very strong, including spatially adjacent pictures offers some advantages. For example, spatially adjacent pictures are useful predictors in unoccluded regions of the scene, during fast object motion, or when objects appear in one view that are already present in neighboring views at the same time instant. An example prediction structure is shown in FIG. 11, where solid lines, generally horizontal, indicate temporal predictions and dependencies, and generally vertical dotted lines indicate spatial predictions and dependencies. There are five views ($v_0$-$v_4$), at eight time instances ($t_0$-$t_7$). Note, the views are temporal adjacent in horizontal time dimension, and spatially adjacent in the vertical view dimension.

View scalability is achieved by encoding the multiview video with hierarchical dependencies in the view dimension. As an example, consider a prediction structure with five views for each time instant as shown in FIG. 11. If the display only requires that three of these views be decoded, then there are two options with minimum decoding requirements.

The first option selectively discards portions of the compressed bitstream 902 that correspond to selected non-targetr views. For example, the two views with bi-directional dependency, i.e., $v_1$ and $v_3$ are discarded. The second option discards the portions in the compressed bitstream that correspond to the views that come later in decoding order, i.e., $v_3$ and $v_4$. The first option increases the relative disparity between views, thereby increasing the amount of resampling that is required. Therefore, to minimize the sampling rate, the second option is a better choice in this example.

In one embodiment of this invention, the scalable multi-view video decoder 1001 of FIG. 10 decodes a subset of views, with the number of views corresponding to the exact number of views supported by the display device. The views are selected to be spaced closer together so that the sampling rate is minimized. That is, the camera baseline distances between the spatially adjacent views is also a minimum.

In a second embodiment of this invention, the scalable multi-view video decoder 1001 decodes a subset of views, with the number of views corresponding to a reduced number of views than supported by the display. This might be necessary or desirable under a number of circumstances.

First, if the required decoding resources to output the number of views supported by the display are not available or would incur long delay, then only a reduced number of views could be provided. Second, it may be more desirable to always have equal baseline distances between spatially adjacent views as output of the decoder, rather than a higher number of decoded views with arbitrary positioning. These instances may arise as a direct result of the prediction dependency between views.

In a third embodiment of this invention, the scalable multi-view video decoder 1001 decodes a subset of views, with the number of views corresponding to a higher number of views than supported by the display. This would be desirable to improve the quality of the oversampled signal, but would require more decoding resources and higher bandwidth. The impact on complexity and bandwidth may be reduced using auxiliary depth maps, which are described in greater detail below.

Spatial Scalability

As described above, the spatial resolution of each view affects the spectrum of the input signal. The minimum sampling rate is derived by finding the tightest packing of replicas of the input spectrum such that none of the non-central replicas overlap with the display prefilter. If the number of views to be decoded is determined as described above and acquisition parameters (acquisition parameterization) such as camera aperture are fixed, then the only remaining degree of freedom is the spatial resolution.

In one embodiment of this invention, the scalable multi-view video decoder 1001 decodes up to the spatial resolution that provides the nearest match to the display resolution. In this way, the need to fully decode a high resolution video and sample the video to the resolution of the display is avoided. Consequently, the scalable multi-view video decoder 1001 does not need to support decoding of multiview video beyond the display resolution indicated by the display parameters 903, and the decoder is able to minimize required memory and processing.

In another embodiment of this invention, the scalable multi-view video decoder 1001 decodes the compressed bitstream to a decoded light field 1003 having a higher spatial resolution that the display resolution. Therefore, the method 105 is required to resample the spatial resolution to that of the display resolution.

Supplemental Enhancement Information

The oversampling factor depends on a maximum disparity between two spatially adjacent views. One way to obtain the maximum disparity is to determine the disparity in the receiver system 1000, based on decoded light fields 1003. This requires a substantial amount of complexity, so is not a preferred solution for real-time receiver implementations.

Conventional multiview video encoders determine disparity vectors between pictures in spatially adjacent views and utilize these disparity vectors for the prediction. It is therefore possible to determine the maximum disparity at the encoder by leveraging the computation that is already being done.

A method of signaling the disparity information to the receiver system 1000 is required. In the context of the H.264/AVC video coding standard, see ITU-T Rec. H.264|ISO/IEC 14496-10, "Advanced Video Coding," 2005, incorporated herein by reference, useful information for decoders that is not required for decoding is carried in supplemental enhancement information (SEI) messages. The SEI messages are transferred synchronously with the content of the video.

According to the embodiments of this invention, the maximum disparity among all spatially adjacent views at the input sampling rate is signaled as part of the SEI message. In one embodiment of the invention, the disparity value is represented in units of full pixel resolution. In a second embodiment of the invention, the disparity value is represented in units of sub-pixel resolution, such as half-pixel resolution or quarter-pixel resolution.

The SEI messages, including syntax that expresses the maximum disparity, are transmitted to the receiver system 1000, and the scalable multi-view video decoder 1001 decodes the maximum disparity. Because the maximum disparity is a scene dependent parameter, it could be time-varying. Therefore, the SEI messages can be sent periodically, and the maximum disparity value could be updated accordingly. New values of maximum disparity imply changes in the oversampling factor.

If the baseline distance between spatially adjacent views changes, e.g., by decoding a certain subset of views, then the maximum disparity value is modified accordingly. For instance, refer to the earlier example in which three views of FIG. 11 are decoded from a total of five views. In this example, the maximum disparity corresponds to the spacing of the five views. Assuming that the camera baseline distances between spatially adjacent views are equal spaced, if portions corresponding to views $v_1$ and $v_3$ are discarded or not decoded as part of the output, then the maximum disparity among output views is doubled because the baseline distance between spatially adjacent views is doubled.

Depth Maps

Figure 12:
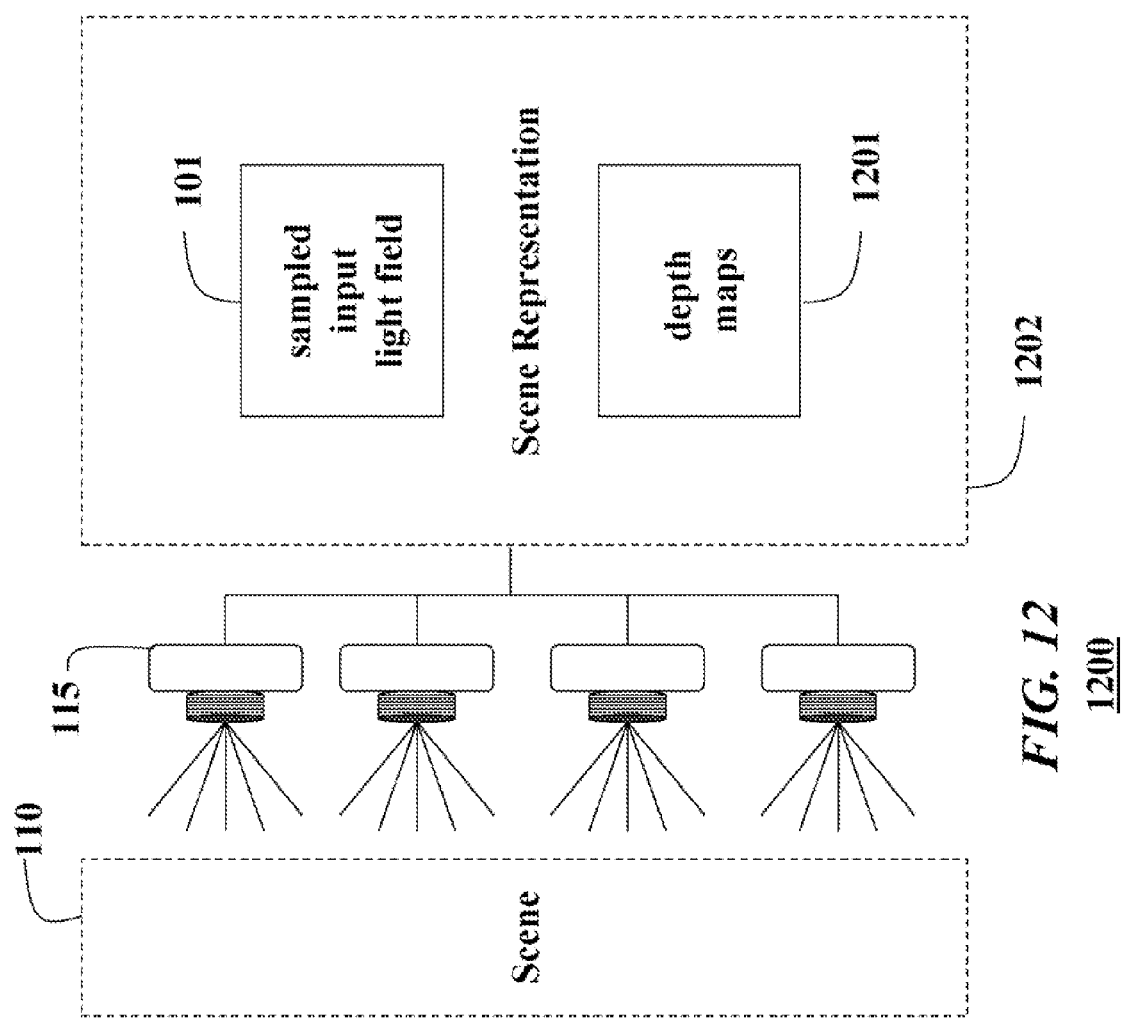
FIG. 12 is a schematic of a system for acquiring a scene representation including depth maps according to an embodiment of the invention.

FIG. 12 shows a light field acquisition system 1200 according to an embodiment of our invention. The multiple cameras 115 acquire the sampled light field, i.e., the sequences of images of videos, of the scene 110. The cameras can be arranged as a horizontal linear array. Preferably the cameras are synchronized with each other. The scene representation 1202 includes the sampled input light field 101 and depth maps 1201. The depth maps can be acquired through special cameras or acquisition hardware as known in the field, or through computation on the sampled input light fields 101. The depth maps can be encoded to produce a depth map bitstream.

Figure 13:
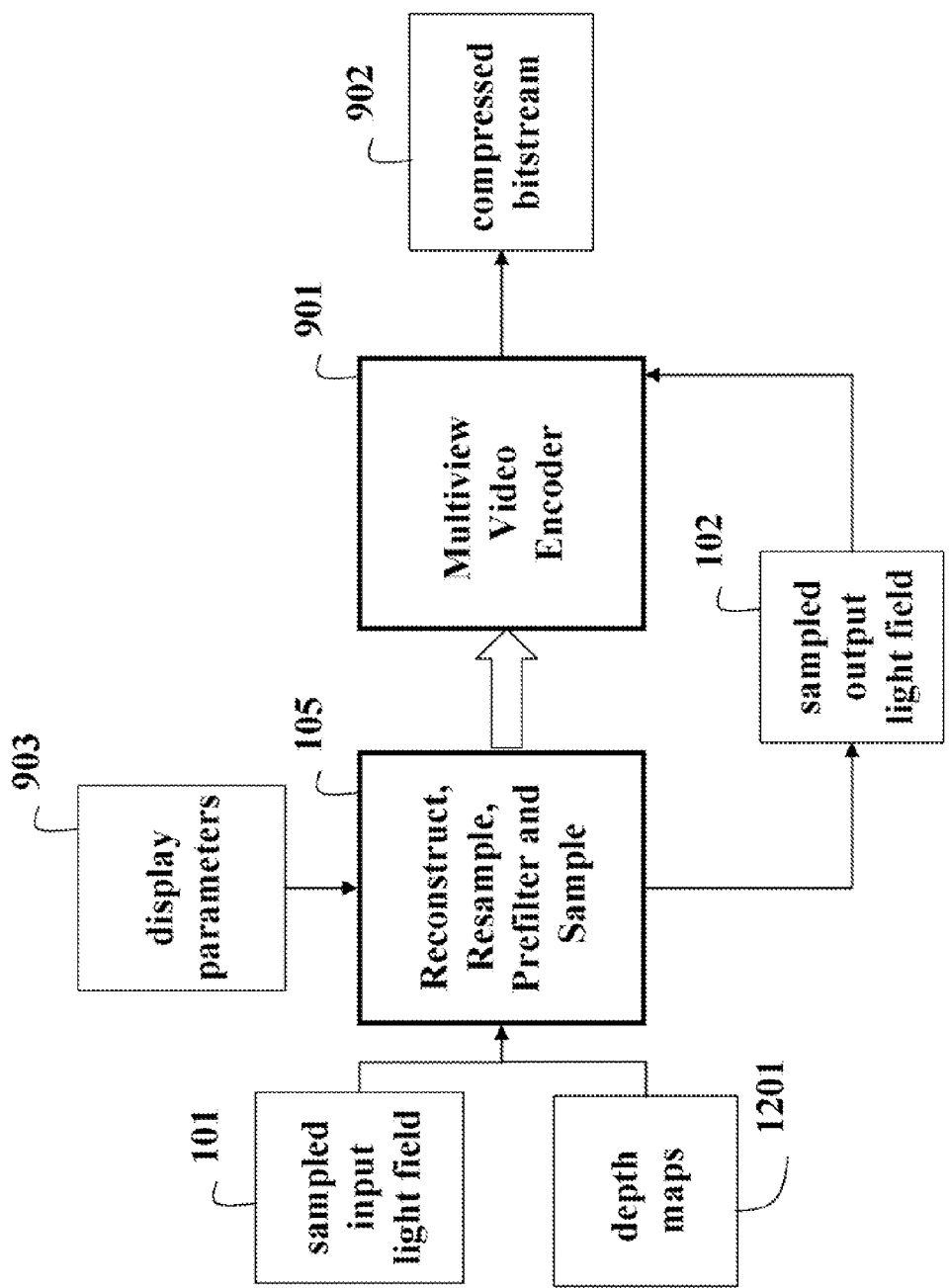
FIG. 13 is a flow diagram of a method for antialiasing and compression using depth maps according to an embodiment of the invention.

In FIG. 13, the depth maps 1201 are used as input to the method 105 along with the sampled input light field 101 and display parameters 903. The depth maps are used for view interpolation within the processing steps of the method 105 to produce the sampled output light field 102. When the method 105 is used as a pre-filter for compression, the sampled output light field 102 is then input to the multiview video encoder 901 to yield the output bitstream 902.

Figure 14:
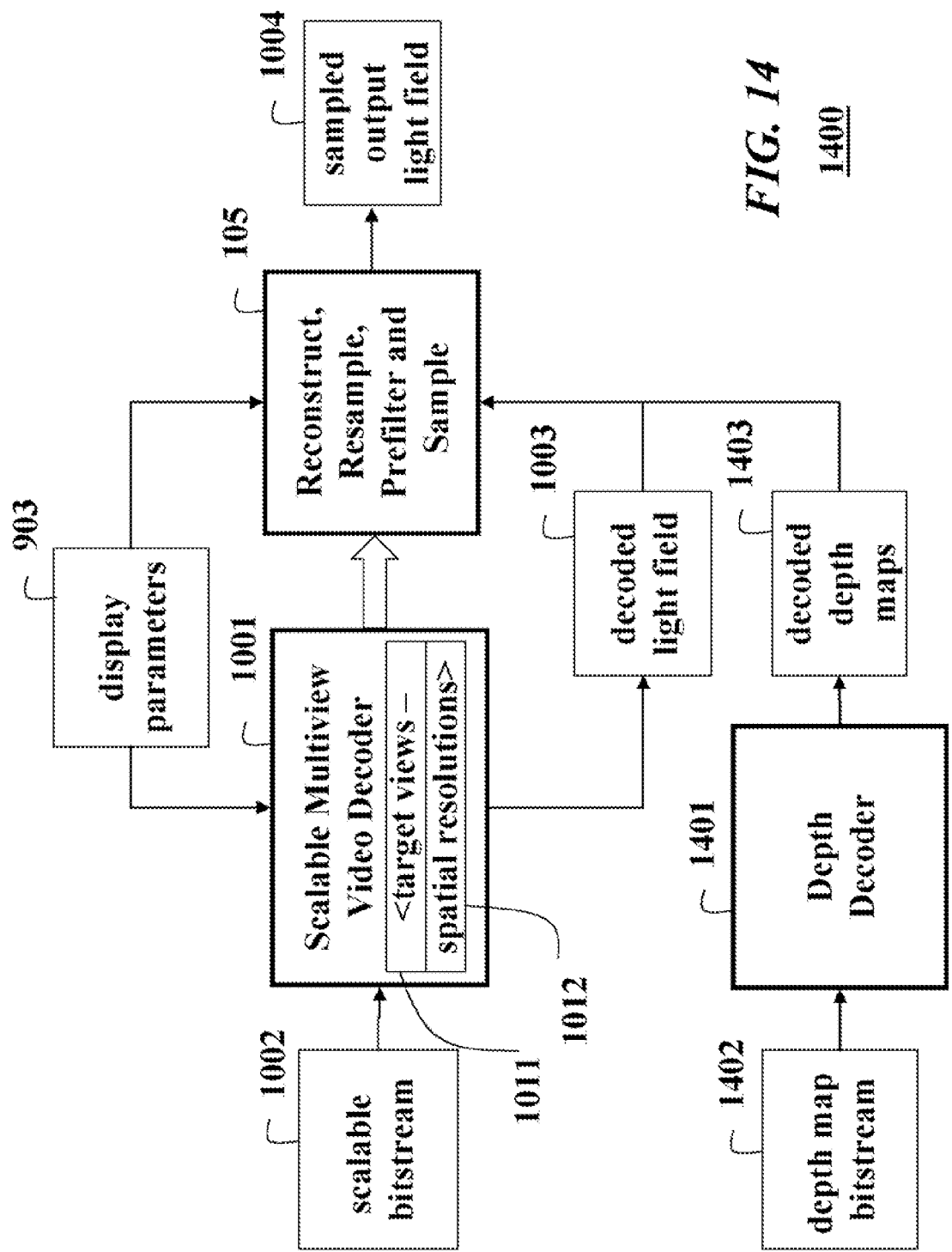
FIG. 14 is a block diagram of a receiver system for scalable decoding with separate decoding of depth maps, and antialiasing according to an embodiment of the invention.

FIG. 14 shows a receiver system 1400 that includes the scalable multi-view video decoder 1001 followed by means implementing the method 105. The scalable bitstream 1002 and the display parameters 903 are provided as input to the scalable multi-view video decoder 1001 to yield the decoded light field 1003. A depth map bitstream 1402, which is an encoded representation of the depth maps 1201 of the scene representation 1202, are also input to the receiver system 1400. The auxiliary depth map bitstream 1402 is decoded by a depth decoder 1401, which produces decoded depth maps 1403. The decoded light field 1003 and decoded depth maps 1403 are input to the method 105 to yield the sampled output light field 1004. The depth maps are utilized for view interpolation within the processing steps of method 105 to produce the sampled output light field 1004.

Figure 15:
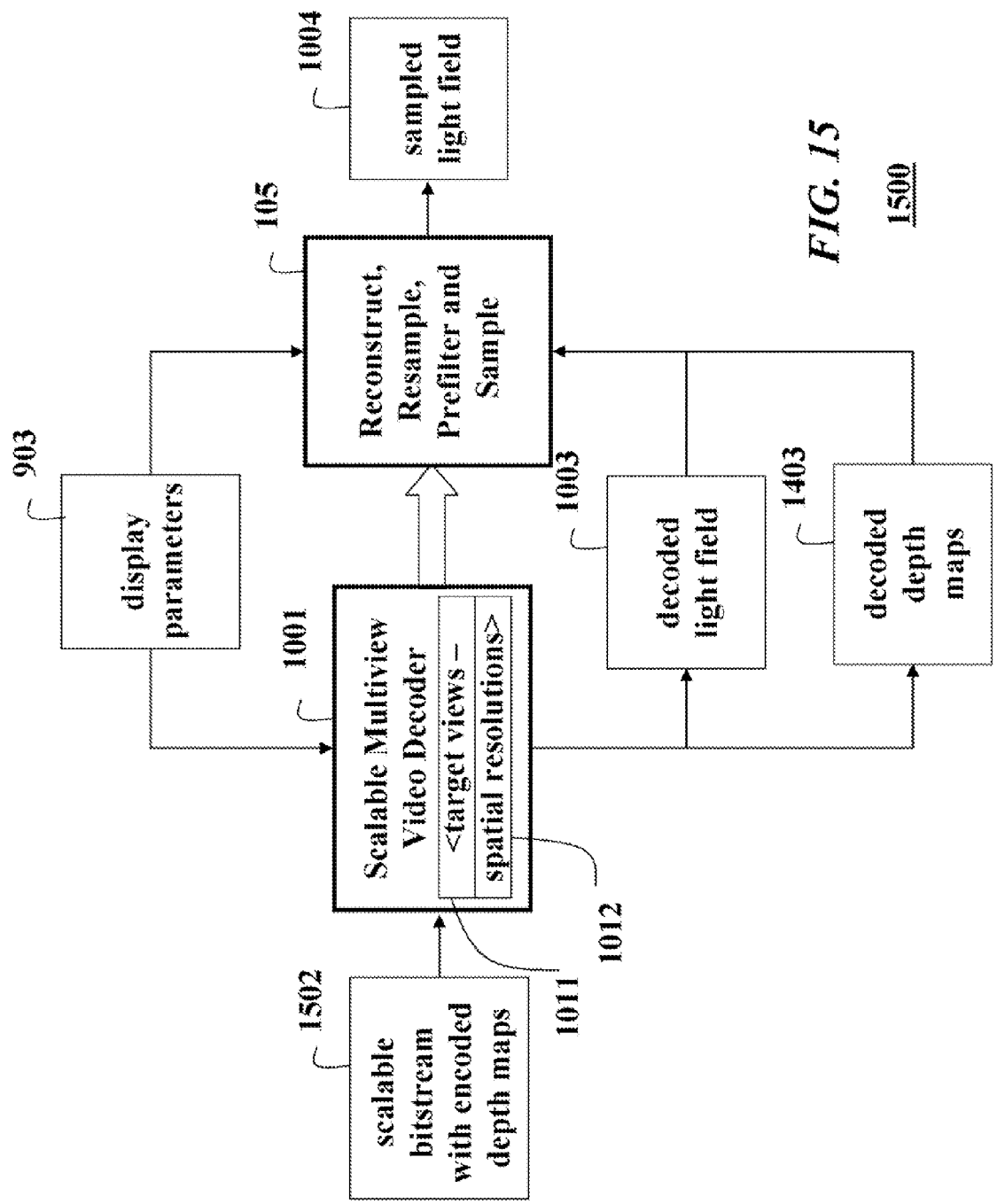
FIG. 15 is block diagram of a receiver system for scalable decoding that includes decoding of depth maps, and antialiasing according to an embodiment of the invention.

FIG. 15 shows a receiver system 1500 that includes the scalable multi-view video decoder 1001 followed by means that implement the method 105. A scalable bitstream 1502, including encoded depth maps 1502 and display parameters 903, are provided as input to the scalable multi-view video decoder 1501 to yield the decoded light field 1003 and the decoded depth maps 1403. The decoded light field 1003 and decoded depth maps 1403 are input to the method 105 to yield a sampled light field 1004.

In the receiver system 1500, the depth maps can be utilized for view interpolation within the processing steps of the method 105 to produce the sampled light field 1004 as is done in receiver system 1400. Alternatively, the scalable multi-view video decoder 1501 can use the decoded depth maps during the decoding to output the decoded light field 1003 with an increased number of views.

Effect of the Invention

The invention provides a method and system for sampling and aliasing light fields for 3D display devices. The method is based on a ray space analysis, which makes the problem amenable to signal processing methods. The invention determines the bandwidth of 3D displays, and describes shallow depth of field behavior, and shows that antialiasing can be achieved by a linear filtering ray space. The invention provides a resampling algorithm that enables the rendering of high quality scenes acquired at a limited resolution without aliasing on 3D displays.

We minimize the effect of the shallow depth of field of current displays by allowing a user to specify a depth range in the scene that should be mapped to the depth of field of the display. The invention can be used to analyze the image quality that can be provided by a given acquisition and display configuration.

Minimum sampling requirements are derived for high quality display. The invention enables better engineering of multiview acquisitions and 3D display devices.

The invention also provides a method and system that uses a resampling process as a filter prior to compression. By suppressing high frequency components of the input signal that contribute to aliasing on 3D displays, the encoded multiview video has a reduced bandwidth.

For instances in which the display parameters are not known during compression, the invention provides a method and system that utilizes the resampling process in various receiver system configurations. View scalability and spatial scalability are employed to minimize computational resources.

To further reduce computational requirements in a receiver system, the invention describes a method for signaling maximum disparity of the input signal to the receiver.

The invention also describes a method and system for acquiring depth maps. The depth maps are used in the resampling process to achieve an oversampled signal. The depth maps can be used for pre-filtering prior to encoding, or coded and transmitted to the receiver.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for acquiring and displaying light fields, comprising, the steps of:
   interpolating input samples of an input light field to produce a reparameterized light field, in which the input samples are different views acquired of a three dimensional scene by a plurality of cameras, and in which the interpolating is according to an acquisition parameterization and a display parameterization;
   prefiltering the reparameterized light field to produce a prefiltered light field; and
   sampling the prefiltered light field to produce output samples having the display parameterization, the output samples for display as an output light field on a three dimensional display device, in which the sampling is an oversampling in a plane of the three dimensional display device to reduce inter-perspective aliasing in an oversampled light field, and in which the oversampled light field is subsampled according to the display the output samples, and wherein a bandwidth of the three dimensional display device is parameterized according to an angular frequency of the three dimensional display device, and a spatial frequencies of the three dimensional display device.

2. The method of claim 1, in which the interpolating uses a depth map acquired of the scene.

3. The method of claim 2, in which the interpolating further comprises:
   reprojecting the input samples using an unstructured lumigraph rendering process.

4. The method of claim 1, in which the interpolating generates additional views of the three dimensional scene.

5. The method of claim 1, in which the oversampling is by a factor of $(d+1)/2$, where d is a maximum disparity of the different views.

6. The method of claim 1, further comprising:
   encoding the output light field to produce a compressed bitstream.

7. The method of claim 6, in which the compressed bitstream is scalable, and further comprising:
   decoding the scalable bitstream in a decoder according to the display parameterization to produce a decoded light field; and
   resampling the decoded light field according to the display parameterization to produce a sampled light field for the three dimensional display device.

8. The method of claim 7, in which the scalable decoder determines a target views, and a target spatial resolution for each target view of the decoded light field.

9. The method of claim 8, in which the target views have temporal dependencies and spatial dependencies, and further comprising:
discarding portions of the compressed bitstream corresponding to selected views during the decoding.

10. The method of claim 8, in which the target views are a set of views with minimum baseline distance between spatially adjacent views of the plurality of cameras.

11. The method of claim 8, in which target views have equal baseline distances between spatially adjacent views.

12. The method of claim 8, in which the target views have temporal dependencies and spatial dependencies, and further comprising:
discarding portions of the compressed bitstream corresponding to a higher spatial resolution than the target spatial resolution during the decoding.

13. The method of claim 7, in which the decoded light field has a spatial resolution higher than a spatial resolution of the three dimensional display device.

14. The method of claim 6, in which the encoding determines a maximum disparity between the target views, and further comprising:
signaling the maximum disparity to the decoder.

15. The method of claim 14, in which the maximum disparity information is signaled in supplemental enhancement information messages according to a H.264/AVC video coding standard.

16. The method of claim 14, in which the maximum disparity is expressed at a pixel resolution.

17. The method of claim 14, in which the maximum disparity is expressed at a sub-pixel resolution.

18. The method of claim 1, in which the interpolating uses a depth map acquired of the scene, and further comprising:
encoding the output light field to produce a compressed bitstream; and
encoding the depth map to produce a depth bitstream.

19. The method of claim 18, further comprising:
providing the compressed bitstream to a scalable decoder to produce a decoded output light field and providing the depth bitstream to a depth decoder to produce a decoded depth map.

20. The method of claim 18 in which the compressed bitstream and depth bitstream are multiplexed to produce a multiplexed bitstream.

21. The method of claim 20, further comprising:
providing the multiplexed bitstream to a scalable decoder to produce a decoded output light field and a decoded depth map.

22. The method of claim 21, in which the decoded output light field includes additional views.

23. The method of claim 22, in which the additional views are generated using the decoded depth map and view interpolation during the decoding.

24. A system for acquiring and displaying light fields, comprising:
means for interpolating input samples of an input light field to produce a reparameterized light field, in which the input samples are different views acquired of a three dimensional scene by a plurality of cameras, and in which the interpolating is according to an acquisition parameterization and a display parameterization;
means for prefiltering the reparameterized light field to produce a prefiltered light field; and
means for sampling the prefiltered light field to produce output samples having the display parameterization, the output samples for display on an output light field using a three dimensional display device, in which the sampling is an oversampling in a plane of the three dimensional display device to reduce inter-perspective aliasing in an oversampled light field, and in which the oversampled light field is subsampled according to the display parameterization to produce the output samples, and wherein a bandwidth of the three dimensional display device is parameterized according to an angular frequency of the three dimensional display device, and a spatial frequencies of the three dimensional display device.

* * * * *